United States Patent [19]

Smith et al.

[11] Patent Number: 5,230,072
[45] Date of Patent: Jul. 20, 1993

[54] SYSTEM FOR MANAGING HIERARCHICAL INFORMATION IN A DIGITAL DATA PROCESSING SYSTEM

[75] Inventors: Duane A. Smith, Manchester; Kelly A. O'Rourke, Merrimac, both of N.H.

[73] Assignee: Digital Equipment Corporation, Maynard, Mass.

[21] Appl. No.: 702,243

[22] Filed: May 17, 1991

Related U.S. Application Data

[63] Continuation of Ser. No. 182,110, Apr. 15, 1988, abandoned.

[51] Int. Cl.$^5$ ............................................. G06F 15/40
[52] U.S. Cl. ........................... 395/600; 364/DIG. 1; 364/237.2; 364/282.1; 364/283.1; 364/283.2; 364/286; 364/286.1
[58] Field of Search .................. 395/600, 700; 364/419

[56] References Cited

U.S. PATENT DOCUMENTS 4,945,475  7/1990  Bruffey et al. ...................... 395/600

FOREIGN PATENT DOCUMENTS 0182043  9/1985  European Pat. Off. ............ 364/518
0204994  12/1986  European Pat. Off. .
0243671  3/1987  European Pat. Off. ............ 364/900

OTHER PUBLICATIONS

IEEE Software, vol. 4, No. 3, May 1987, IEEE (New York, U.S.), S. Isoda et al: "VIPS: a visual bebugger," pp. 8–19.
Elektronik, vol. 34, No. 6, Mar. 1985, (Munich, DE), M. Haupt: "Dialogsoftware einmal programmiert," pp. 101–105.
Proceedings Autotestcon '84, 5–7 Nov. 1984, Washington, D.C. IEEE, C. Rairdin: "A software executive for menu-driven programs," pp. 376–379.
Hewlett-Packard Journal, vol. 37, No. 7, Jul., 1986, A. G. Anderson et al.: "New HP-UX features for HP workstations" pp. 34–41.
Proceedings 1st International Conference on Computer Workstations, Nov. 11–14, 1985, P. Dewan et al., "An approach to generalized editing," pp. 52–60.
The Eureka! Desk Accessary, pp. 1–2.
HFS Backup User's Manual, Nov. 1986, pp. 1–36.
More II, Trial Size Guide to MORE II Planning, Writing and Desktop Presentations, pp. 1–36.
User's Manual for the Apple Macintosh, THINK-TANK, pp. 1–48.
The Apple Computer, Inc. "Macintosh" manual, pp. 1–41 and 50–113.

*Primary Examiner*—Michael R. Fleming
*Assistant Examiner*—Debra A. Chun
*Attorney, Agent, or Firm*—Fish & Richardson

[57] ABSTRACT

A system for use in conjunction with a digital data processing system includes an applications program, a user interface and a hierarchy information management system. The applications program generates an information hierarchy including a plurality of hierarchy information items organized in a plurality of hierarchy levels. The user interface includes a display for displaying information to a user and an event initiator, such as, for example, a keyboard or a mouse for generating event information. The hierarchy information management system receives hierarchy information items at selected hierarchy levels from the applications program and transmits the received hierarchy information items to the display of the user interface for display, and responds to the event information by initiating selected operations in connection with the received hierarchy information.

63 Claims, 17 Drawing Sheets

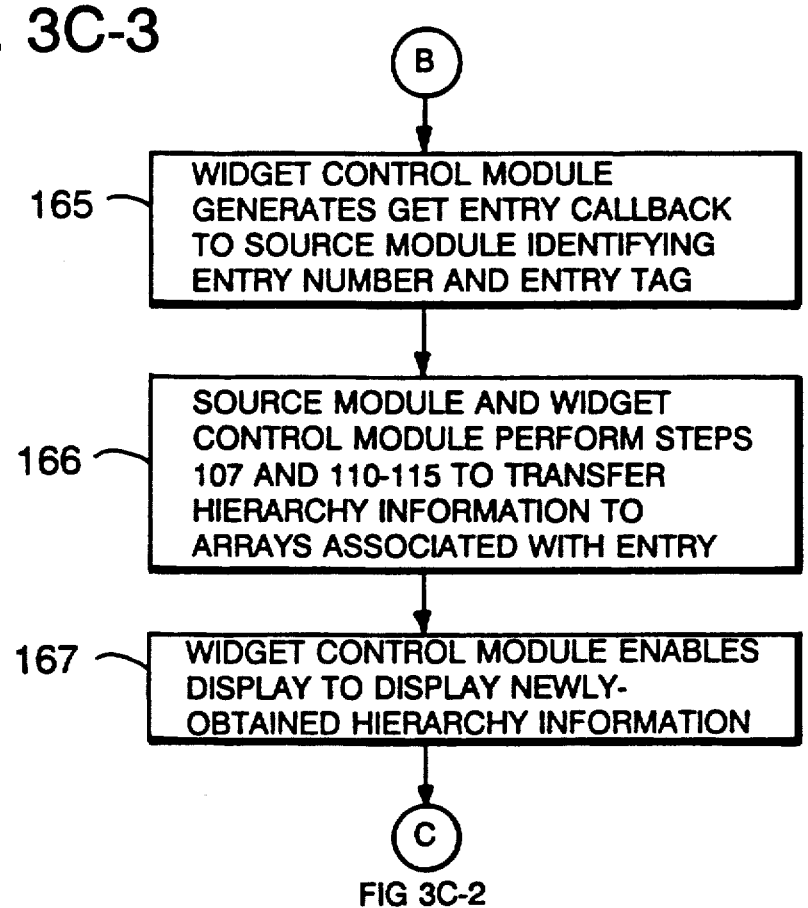

SYSTEM FOR MANAGING HIERARCHICAL INFORMATION IN A DIGITAL DATA PROCESSING SYSTEM

This is a continuation of copending application Ser. No. 07/182,110 filed on Apr. 15, 1988, abandoned.

FIELD OF THE INVENTION

The invention relates generally to the field of digital data processing systems, and more particularly provides a system for managing and displaying hierarchically arranged information for an applications program generating the information and a user who can use the information.

BACKGROUND

Digital data processing systems, or computer systems, allow users to organize and maintain large amounts of information from a number of applications programs, and to generate information for use by those or other applications programs. In many cases, it is desirable to divide the massive amounts of information that a user may have available to him on the computer into a number of diverse items. To organize the information, the information may be classified according to a multiple-level classification scheme. Familiar examples of such classification schemes include the Dewey Decimal System for classifying books in a library, division of a reference book on a particular topic into a number of diverse parts, each perhaps having a plurality of subsidiary subdivisions, and so forth, and organization of documents into filing cabinets, drawers and folders, all of which provide a tree-like classification structure such as would be provided in, for example, an outline.

Several examples may help explain the use of hierarchical organization of information in a computer system. Information used in, for example, an accounting program may be divided into, at a first level, accounts receivable information, accounts payable information, asset information, liability information, and so forth. The accounts receivable information, in turn, may be organized by the party owing the receivable, and then further divided by the aging of the receivable. Similarly, the accounts payable information may be organized by the party to whom the payable is owed and then further divided by the aging of the payable. The assets may be divided into the type of asset, that is, whether the asset is current or fixed. Continuing with the example, the current assets may be further divided by whether they are cash or cash equivalents, with cash being further organized by the banks in which it is deposited and cash equivalents being further organized into the type of asset, such as stock, bond, and so forth. Similarly, the fixed assets may be organized by whether the asset is depreciable or not depreciable, further organized by location, and so forth.

Similarly, using a mail applications program on a computer system, a user may generate memoranda and transmit them to other users on the computer system. In addition, using the mail applications program, the user may receive memoranda generated by other users. In many cases, a user may wish to organize the received memoranda by originator, dividing the memoranda according to the originators' departments, sections, or other subdivisions in which the company may be partitioned. If the memoranda are organized in this manner, the user, by specifying a subdivision may easily retrieve only the memoranda from originators in the specified subdivision, which may reduce the time required to review his mail if he is not interested in memoranda from other subdivisions. Alternatively, or additionally, a user may wish to organize the memoranda by subject matter, which may also be divided into a plurality of levels, and review memoranda only relating to particular subjects.

SUMMARY OF THE INVENTION

The invention provides a new and improved hierarchical information management system for enabling a computer system to manage and display hierarchically-organized data in a digital data processing system.

In brief summary, the new system includes an applications program, a user interface and a hierarchy information management system. The applications program generates an information hierarchy including a plurality of hierarchy information items organized in a plurality of hierarchy levels. The user interface includes a display for displaying information to a user and an event initiator, such as, for example, a keyboard or a mouse for generating event information. The hierarchy information management system receives hierarchy information items at selected hierarchy levels from the applications program and transmits the received hierarchy information items to the display of the user interface for display, and responds to the event information by initiating selected operations in connection with the received hierarchy information.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A-1 through 3F depict flow diagrams useful in understanding the operations of the hierarchical information management system depicted in FIG. 1.

DETAILED DESCRIPTION OF AN ILLUSTRATIVE EMBODIMENT

A. General Description

Figure 1:
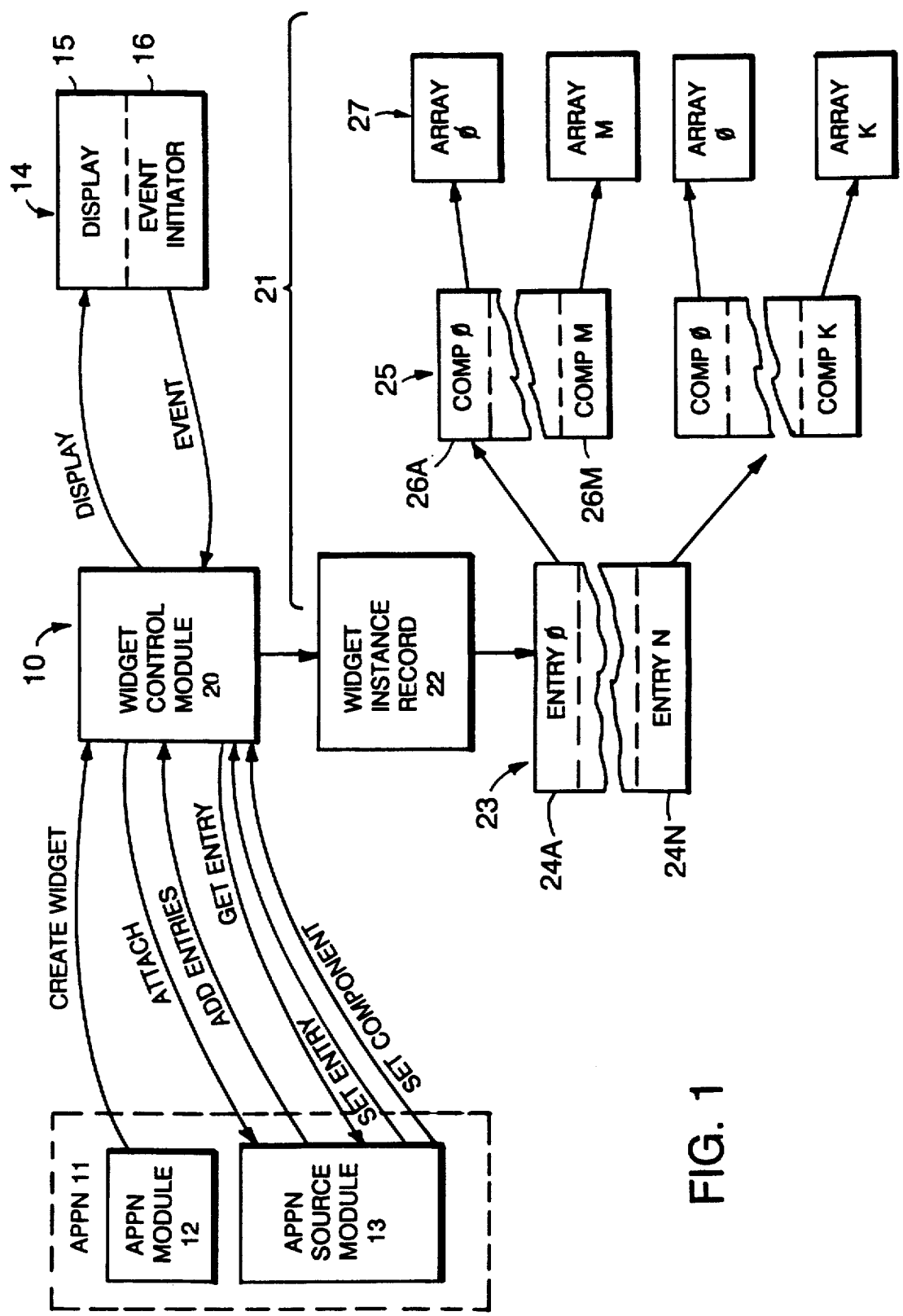
FIG. 1 is a functional block diagram of a hierarchical information management system in accordance with the invention.

FIG. 1 depicts a functional block diagram of a hierarchical information management system 10 constructed in accordance with the invention. Preliminarily, in one specific embodiment, the new hierarchical information management system 10 comprises a program for use in a computer system and provides one or more interfaces between an applications program and users. With reference to FIG. 1, the hierarchical information management system 10 communicates with an applications program 11, which includes an applications module 12 and a source module 13. The applications program 11 organizes its applications information into a multiple-level hierarchy having a tree-like structure, in which each information category at a level may have one or more sub-categories. The hierarchical information management system 10 communicates with the applications program to obtain therefrom information regarding the hierarchy in which the applications program has categorized the applications information. Upon obtaining the hierarchy information, the hierarchical information management system 10 displays at least a portion of the hierarchy information to a user interface 14, and particularly to a display 15, for display to a user. In particular, the hierarchical information management system 10 may initially display the hierarchy information from the root level, at the top of the hierarchy, down to a predetermined lower level.

Preliminarily, by way of background, the display 15 displays information to a user in a window associated with the applications program 11. The display 15 may have a plurality of windows each associated with an applications program. The applications program 11 may allocate various portions of its window to various systems, including the hierarchical information management system 10, to various menus and pushbuttons, and so forth. In its display operations, the hierarchical information management system 10 displays the hierarchy information in the window allocated to it by the applications program.

After the hierarchical information management system 10 has displayed the information, the user, using an input device, such as a keyboard or a mouse, as an event initiator 16, may perform various selection operations in connection with various items of hierarchy information and enable the hierarchical information management system 10 or the applications program 11 to perform various operations in connection with the selected items. For example, by manipulating a mouse, a user may initiate an event which results in the selection of one or more items of information in the hierarchy. If the user enables the hierarchical information management system 10, it may expand or collapse the displayed portion of the hierarchy, so that items under a selected item, for example, may be displayed (if hidden) or hidden (if displayed) on the display. If the user enables the applications program 11 through a menu or a pushbutton, it may perform a predetermined operation in connection with the selected item.

The hierarchical information management system 10 includes a widget control module 20, which initiates a plurality of operations described below in connection with FIGS. 3A through 3F, and a plurality of widget instance structures 21, one of which is shown in FIG. 1. A widget instance structure 21 is effectively associated with an interface between the applications program 11 and the user interface 14, and so an applications program may have one or more interfaces with one or more users with each interface being associated with one of the widget instance structures 21.

The widget control module 20 manages communications with the applications module 12 and the source module 13, establishes a widget instance structure 21 and manages the display of the hierarchy information to the user and receives certain event information from the user interface 14. The applications program 11 and the widget control module 20 communicate through calls and callbacks, which will be described in detail below. Generally, however, the applications program 11, including both the applications module 12 and the source module 13, performs calls to the widget control module 20 to enable the widget control module 20 to perform certain operations, to provide hierarchy information to be displayed, and to obtain status information, such as whether or not a particular item of hierarchy information is selected which may be used in connection with processing in response to the user initiating a menu item or a pushbutton. The widget control module 20 performs callbacks to the source module 13 to obtain hierarchy information, to notify the source module 13 of various events and to respond to requests for status information.

As noted above, a particular interface, between an applications program 11 and a user interface 14 effectively corresponds to a widget instance structure 21. A widget instance structure 21, whose components are described in detail in connection with FIG. 2, includes a widget instance record 22 that points to an entry list 23, comprising a plurality of entries 24A through 24N (generally identified by reference numeral 24). In one specific embodiment, the entry list 23 comprises a linked list, that is, each of the entries 24 in the entry list 23 points to the next and previous entries in the entry list 23. Each entry 24 in the entry list 23, in turn, also points to a component list 25. The component list 25 includes a plurality of component entries 26A through 26M (generally identified by reference numeral 26) each pointing to a data array generally identified by reference numeral 27 that contains hierarchy information.

Before proceeding further, it would be helpful to describe some of the calls and callbacks transmitted between the applications program 11 and the widget control module 20, and the operations performed in response thereto. To initialize an interface, the applications program 11, and, specifically, the applications module 12, issues a CREATE WIDGET call, which includes as parameters a widget name, display information and callback pointers, which point to routines processed by the source module 13 to process the callbacks from the widget control module 20. As is conventional, the applications program 11 may have an associated display window on the display 15 in the user's user interface, which may comprise all or only a portion of the display's screen (not shown), and the display information may include such information as a portion of the applications program's window in which the hierarchical information management system 10 may display the hierarchical information, thereby effectively defining a window for the hierarchical information management system 10.

In response to a CREATE WIDGET call, the widget control module 20 creates a widget instance structure 21, in which the parameters are stored as described below in connection with FIG. 2, and generates an ATTACH callback to the source module 13. In response to the ATTACH callback, the source module 13 generates one or more ADD ENTRIES calls to the widget control module 20 that identify an initial number of entries 24 for the widget control module 20 to create in the entry list 23. The widget control module 20 then creates the data structure comprising the entry list 23, specifically creating a number of entries corresponding to the number set forth in the AD ENTRIES calls from the source module 13.

Following creation of the entry list 24, the widget control module obtains from the source module the information to display in the window of the user interface 14 allocated to the hierarchical information management system 10, creates the component list 25 and arrays 27 to store the hierarchical information, and enables the hierarchical information from the arrays 27 to be transmitted to the display 15 for display to the user. In this operation, the widget control module 20 generates a GET ENTRY callback for the source module 13 for each entry whose information is being obtained. The GET ENTRY callback identifies the entry whose information is being obtained. In response, the source module generates a SET ENTRY call for the widget control module 20 to provide information for the entry, such as the number of components, and a SET COMPONENT call, which identifies the information for the array 27, for each of the components 26 associated with the entry 24 The widget control module 20 iteratively generates GET ENTRY callbacks until it either receives sufficient information to fill its window in the display 15 or until it reaches the last entry 24 in the entry list 23.

After displaying the initial window of the hierarchy information associated with the entries 24 as provided by the source module 13, the widget control module 20 waits for an event from the event initiator 16 in the user interface 14. An event may indicate, for example, that a user has depressed a key on a keyboard and/or a pushbutton on a mouse in connection with an item of hierarchical information, which, in turn, is associated with an entry 24 and a component 26. The hierarchical information management system 10 provides several general types of events, including a selection event, a selection and confirmation event, and a scrolling event.

In a selection event, a user selects an item of hierarchy information, which may then be the subject of an operation selected from a menu or pushbutton. In one embodiment, the widget control module 20 identifies a selected item to the user on display 15 by displaying it in reverse video. Following selection of an item, the user may also deselect the item without initiating a menu- or pushbutton-initiated operation. In response to selection of an item, the widget control module also generates an ENTRIES SELECTED callback to the source module 13 identifying the selected entries.

In a selection and confirmation event, a user selects an item of hierarchy information and initiates a default operation in connection therewith. In that default operation, the applications program 11 may perform an expansion operation to display the items of hierarchy information in the next level depending from the selected item. Alternatively, if the hierarchical information management system 10 is already displaying the items of hierarchy information below the selected item, it may perform a collapse operation in which it removes the items from the display 15. In one embodiment, to initiate both a select operation and a select and confirm operation using a mouse as the event initiator 16, the user manipulates the mouse as a pointer to point to the item of hierarchy information to be selected and depresses a button on the mouse. If the user presses the button once, the hierarchical information management system 10 performs a selection operation in connection with the item, and if the user presses the button twice it performs a selection and confirmation operation.

In a scrolling operation, the user enables scrolling of the display through the items of hierarchy information. In the scrolling operation, either up or down, the hierarchical information management system 10 displays the path to the root, that is, items of hierarchical information to the topmost level. Thus, during the scrolling operation, the hierarchical information management system 10 does not necessarily eliminate the item in the top line of its window of the display 15 during a scroll up operation, or move the item in the top line during a scroll down operation, but instead selects the item so that the path to the root is always displayed.

In one embodiment, the user may initiate a scrolling operation in several ways, including dragging the mouse to an upper or lower edge of the window associated with the hierarchical information management system 10, and by manipulation of a pushbutton on a scroll bar in the window associated with the hierarchical information management system 10. In the dragging operation, the user may previously have selected one or more of the items of hierarchical information; when that occurs, the hierarchical information management system 10 may move the items to another location indicated by the event initiator 16 at the end of the scroll operation.

With this background, after the hierarchical information management system 10 has initially obtained and displayed the items of hierarchy information from the source module 13, in response to a user selecting an item and initiating an operation by means of a menu or pushbutton, the source module 13, if it does not already have the identifications of the selected entries, first transmits a NUM SELECTED call to the widget control module to obtain the number of selected entries. The source module 13 uses the number returned by the widget control module to size a buffer. The source module 13 then transmits a GET SELECTIONS call to the widget control module 20, including a pointer to the buffer. The widget control module then loads the identifications of the selected entries 24 into the buffer.

In response to a select and confirmation operation, the widget control module 20 generates a SELECT AND CONFIRM callback to the source module 13, which identifies the selected entry 24 and component 26. The source module 13 then initiates a default operation in connection with the entry 24 and component 26. If the default operation is an expand operation, and if the selected entry 24 is not fully expanded, the source module 13 generates an ADD ENTRIES call to the widget control module 20 to add entries 24 to the entry list 23 after the selected entry 24. The ADD ENTRIES call identifies a number of entries to be added as well as the selected entry 24 as the entry after which the entries are to be added. In response, the widget control module 20 generates the entries 24 and links them into the entry list 23 after the identified entry. If the hierarchy information associated with the entries is to be displayed, the widget control module 20 also generates a GET ENTRY callback for each entry, to which the source module 13 responds with the SET ENTRY and SET COMPONENT calls to provide the necessary hierarchy information for the entries 24 and associated components 26 and array 27.

If, on the other hand, the entry 24 is fully expanded, that is, if it is a leaf on the tree-structured hierarchy, the source module 13 may, as the default operation, enable the display 15 to display information relating to the selected entry. For example, if the application 11 is a mail program, the source module 13 may enable the display 15 to display mail messages relating to the selected entry 24. Similarly, if the applications program is a filing system, with the entries 24 representing hierarchies resembling, for example, filing cabinets, drawers, folders, documents, and so forth, from the top level of the hierarchy to the bottom, the source module 13 may enable the display to display the selected document.

If the default operation initiated in response to a SELECT AND CONFIRM callback is a collapse operation, the source module 13 first verifies that the entry list 23 contains entries 24 depending therefrom in the next level down in the hierarchy. If so, those entries 24 are stored in the entry list immediately following the selected entry 24. Thus, in the collapse operation, the source module 13 generates a DELETE ENTRIES call to the widget control module 20, identifying the entry 24 after which the depending entries 24 are to be deleted, which corresponds to the selected entry 24, and also identifying the number of entries 24 to be deleted. The widget control module 2 then deletes the entries 24 from the entry list 23 and removes the hierarchy information relating to those entries from the display 15.

Removal of the hierarchy information from the display 15 in response to the DELETE ENTRIES call may provide room for other hierarchy information associated with other entries 24, and so the widget control module 20 may enable the display 15 to display hierarchy information from arrays 27 related thereto. If the hierarchy information for an entry 24 to be displayed is not present in an array 27, the widget control module 20 generates the GET ENTRY callback to the source module 13, which responds with the SET ENTRY and SET COMPONENT calls as described above.

In one specific embodiment, the widget control module 20 performs two diverse types of scrolling operations, including scrolling and dragging. In scrolling, the hierarchy information associated with entries 24 are moved up or down on the window associated with the hierarchical information management system 10 on display 15. At the same time, hierarchy information associated with other entries 24 may be added at the bottom or directly under the path-to-root information near the top of the window in the manner as described above.

In a dragging operation, the user selects one or more entries and, by manipulating a mouse in one embodiment, moves the mouse pointer to point to another location in the window. The widget control module 20 generates a SELECTIONS DRAGGED callback to the source module 13 identifying the entry 24 associated with the location of the pointer. The source module 13 generates a DELETE ENTRY call to delete the selected entry or entries 24 from the entry list 23 at the point where they were selected, and an ADD ENTRY call to add the entries 24 after the entry 24 in the entry list identified in the SELECTIONS DRAGGED callback. To obtain hierarchy information to display, the widget control module 20 generates a GET ENTRY callback for the source module 13, which responds with the SET ENTRY and SET COMPONENT calls to provide the hierarchy information for the entries 24, components 26 and arrays 27.

The applications program 11, and specifically the source module 13, may also enable the widget control module 20 to perform several operations in connection with the widget instance structure 21 as described below in connection with FIGS. 3A through 3F. In addition, the applications program 11 may destroy a widget represented by the widget instance structure by an appropriate message to the widget control module 20. In response, the widget control module 20 generates a DETACH FROM SOURCE callback to the source module 13 identifying the widget.

B. SPECIFIC DISCUSSION

1. Data Structures

With this background, the specific data structures used in one specific embodiment of the widget instance record 22, entry list 23, component list 25 and arrays 27 will now be described in connection with FIG. 2. With reference to FIG. 2, the widget instance record 22, which is established by the widget control module 20 in response to the CREATE WIDGET call from the application module 12, includes a number of fields, including a widget identification field 30 that identifies the widget represented by the widget instance record, and a callback pointers field 31 that receives pointers to routines in the source module 13 that process the callbacks from the widget control module 20. Essentially, the widget control module selects a callback routine pointer to identify a callback type when it generates a callback for the source module 13. The contents for both the widget identification field 30 and the callback pointers field correspond, to the widget name and callback pointers received by the widget control module 20 in the CREATE WIDGET call.

The widget instance record 22 also includes several fields that relate to the entry list 23. Specifically, the contents of an entry pointer field 32 point to the first entry 24A in the entry list 23, and a field 33 contains a value that identifies the number of entries 24 in the entry list.

The widget instance record 2 also includes fields that contain information relating to the display of the hierarchy information on the display 15. In particular, a level fonts field 34 contains information that identifies the different fonts in which text is to be displayed in the diverse levels of the hierarchy. A display attributes field 35 contains such information as the location, relative to the window for the applications program 11, for the window associated with the hierarchical information management system 10. Finally, a field 36 contains pointers to objects which may be used by the widget control module 20 in connection with the widget instance record 22. For example, the widget control module 20 may display such objects as scroll bars and so forth in the window associated with the hierarchical information management system 10, which objects may be represented by pointers stored in field 36.

As noted above, the entry list 23, in one embodiment, is a linked list of entries 24, with each entry corresponding to one category of the hierarchy information provided by the source module 13. The entry pointer 32 in the widget instance record 22 points to the beginning of the first entry 24A of the entry list 23. Since the entry list 23 is a linked list, the first field 40 of each entry 24 contains a pointer to the next entry in the list and a second field 41 which contains a pointer to the previous entry in the list. The widget control module 20 may traverse the entry list 23 forwardly entry by entry using the contents of the fields 40 in each of the entries, and backwardly using the contents of fields 41 in each of the entries. In the first entry 24A, the contents of field 41 points to the last entry 24N in the entry list, and, in the last entry 24N, the contents of field 40 points to the first entry 24A, thereby linking the two ends of the entry list 23.

An entry 24 also includes a number of fields containing control and status flags, including a valid flag 42, a selected flag 43 and an unselectable flag 44. The condition of the valid flag 42 indicates whether the widget control module 20 has available to it the hierarchy information associated with the entry 24. The hierarchy information would be contained in arrays 27.

The condition of the selected flag 43 indicates the selected condition of the entry 24, that is, whether, by manipulation of the event initiator, the user has noted the displayed information relating to the entry 24 is to be selected. The condition of the unselectable flag 44 indicates whether the user can select the entry 24. If the user selects a component 26 of the entry 24, a selected component identification field 45 identifies the particular component 26 selected.

The entry 24 further includes several additional fields containing information used by the widget control module 20 in its operations. A level number field 46 identifies the level in the hierarchy of the entry 24. An entry tag field 47 receives an entry tag value provided by the source module 13 which identifies the entry 24 to the source module 13. A display information field 50 contains display information received from the source module 13. The display information identifies the amount of space on the display required to display the hierarchy information associated with the entry 24. Finally, the entry 24 includes two fields whose contents relate to the component list 25, namely, a component pointer field 51 and a number of components field 52. The component pointer field 51 points to the first component entry 26 in the components list 25 and the number of components field 52 identifies the number of component entries 26 in the components list 25.

The component entries 26 in the component list 25 all have the same structure, and so only one component entry 26 will be described in detail. A component entry 26 includes three fields, namely, a component type field 60, a display attributes field 61, and an array pointer field 62. The component type field 60 identifies the type of component represented by the component entry 26, that is, for example, whether the information associated with the component is text or graphical information. The contents of the component type field 60 may, if it indicates that the information is graphical, also indicate the manner in which the information is encoded, that is, for example, whether it is bit-mapped, vector, compressed and so forth. The display attributes field includes information as to the location, within the portion of the display associated with the entry 24, in which the information associated with the component entry 26 is to be displayed.

Finally, the array pointer 62 contains a pointer to the array 27 which contains the information associated with the component entry to be displayed to the user by way of the display 15 of the user interface 14. The array 27 may contain, for example, a text string or graphical information encoded as indicated by the contents of the component type field 60.

2. Operations

The various operations of the applications program 11, including the applications module 12 and source module 13, and the widget control module 20, including the calls and callbacks therebetween, will now be described in connection with FIGS. 3A-1 through 3F.

a. Widget Creation

Figure 2:
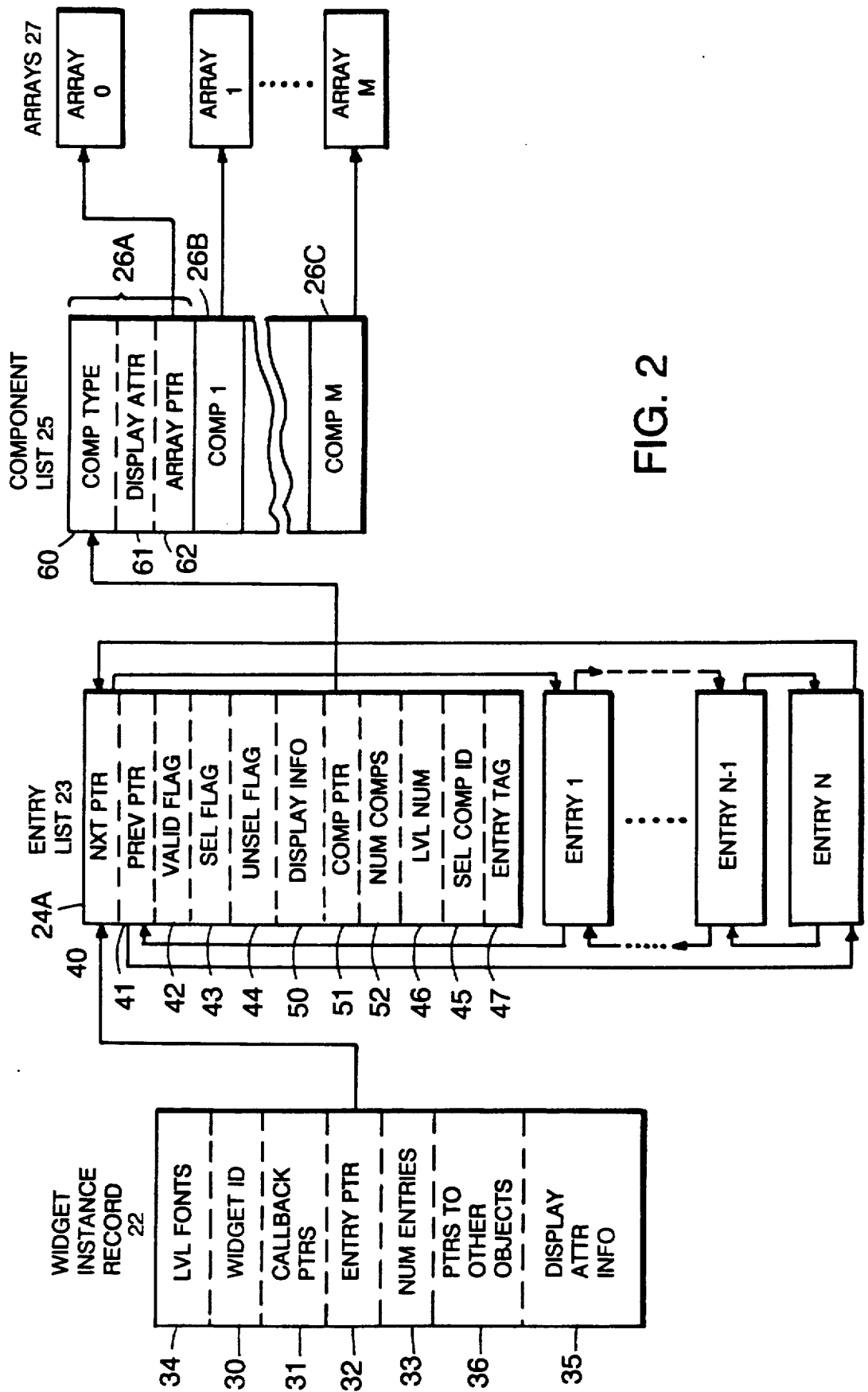
FIG. 2 depicts data structures useful in understanding the hierarchical information management system depicted in FIG. 1.
Figures 1, 3A:
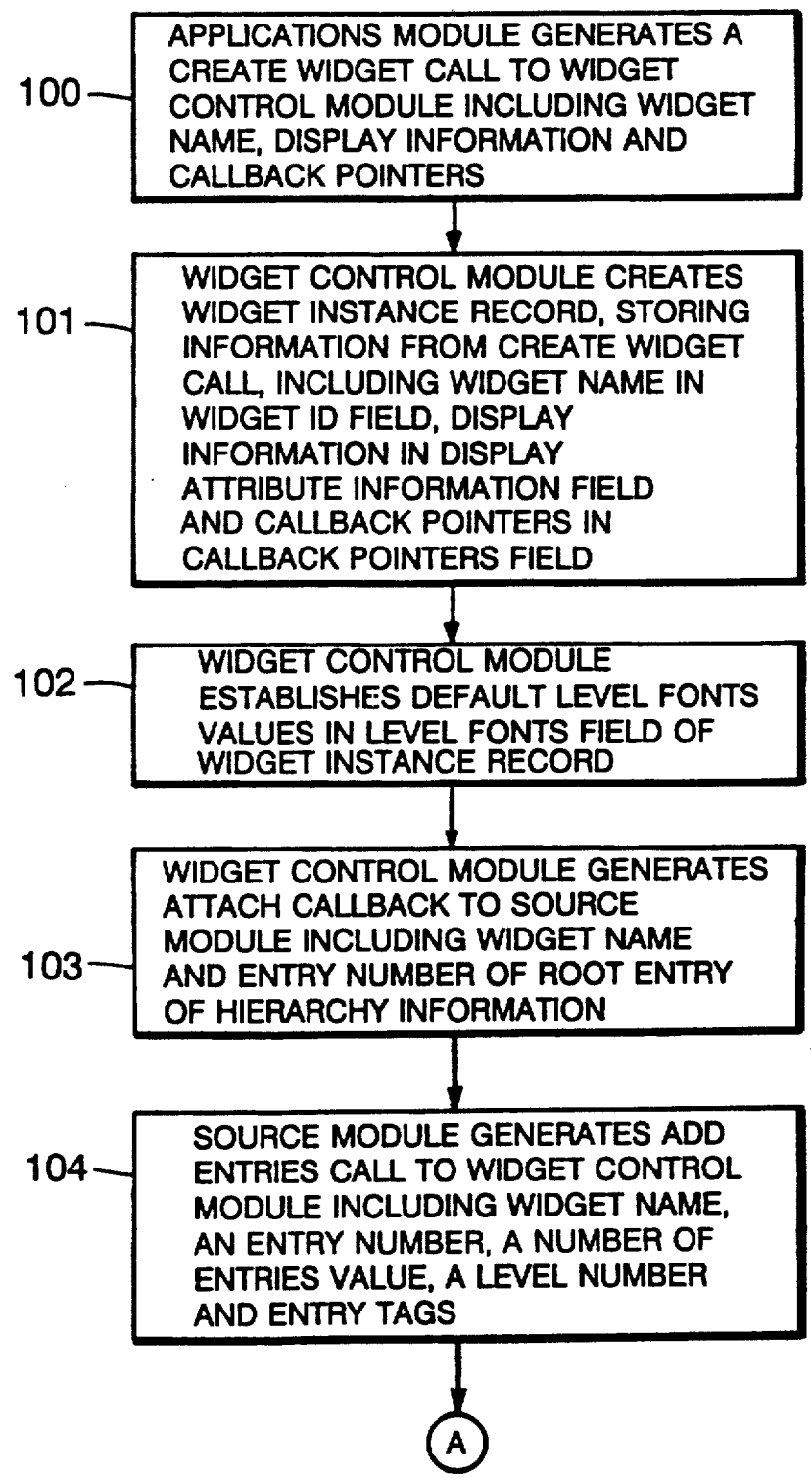
Figures 2, 3A:
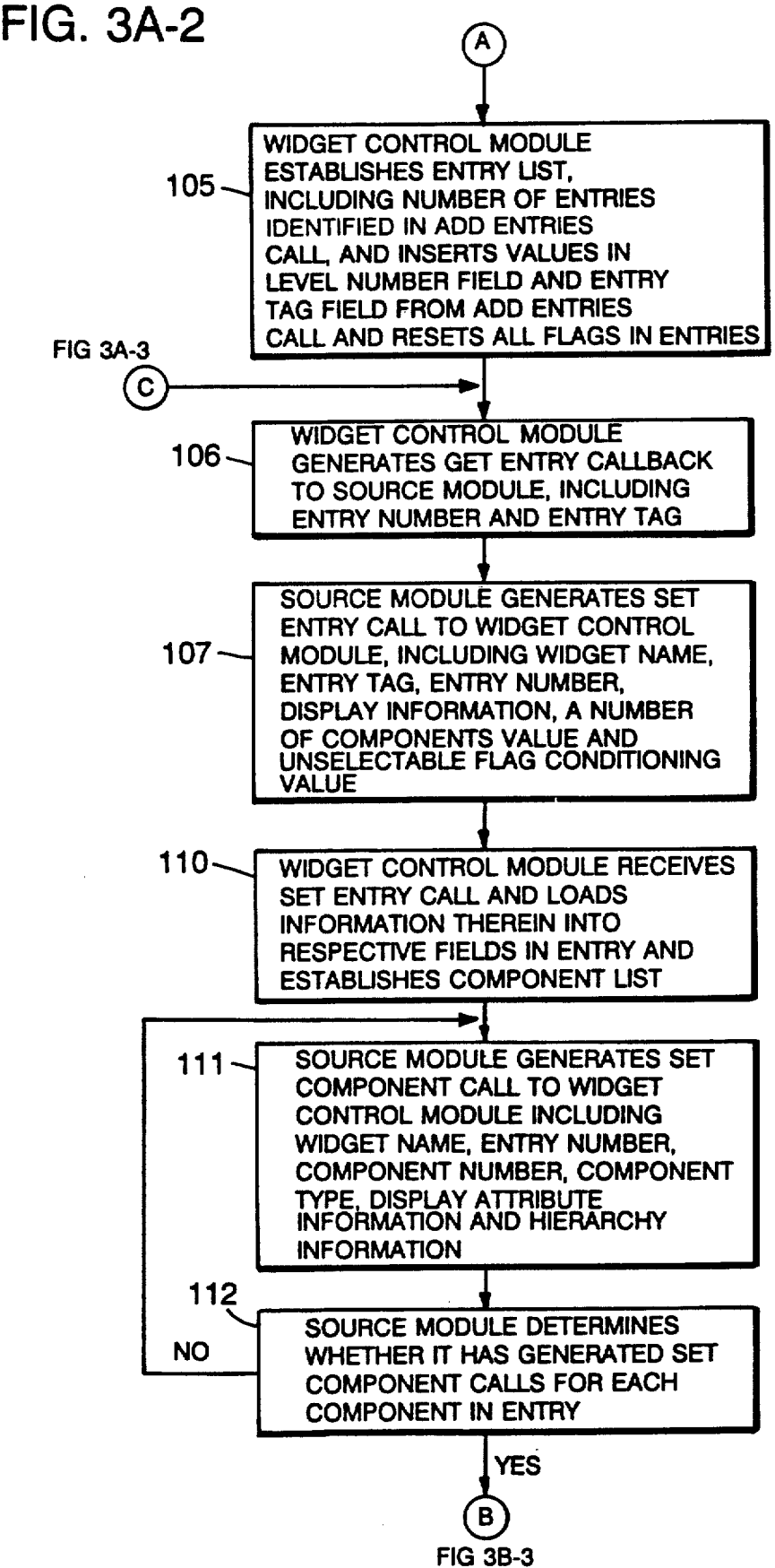
Figures 3, 3A:
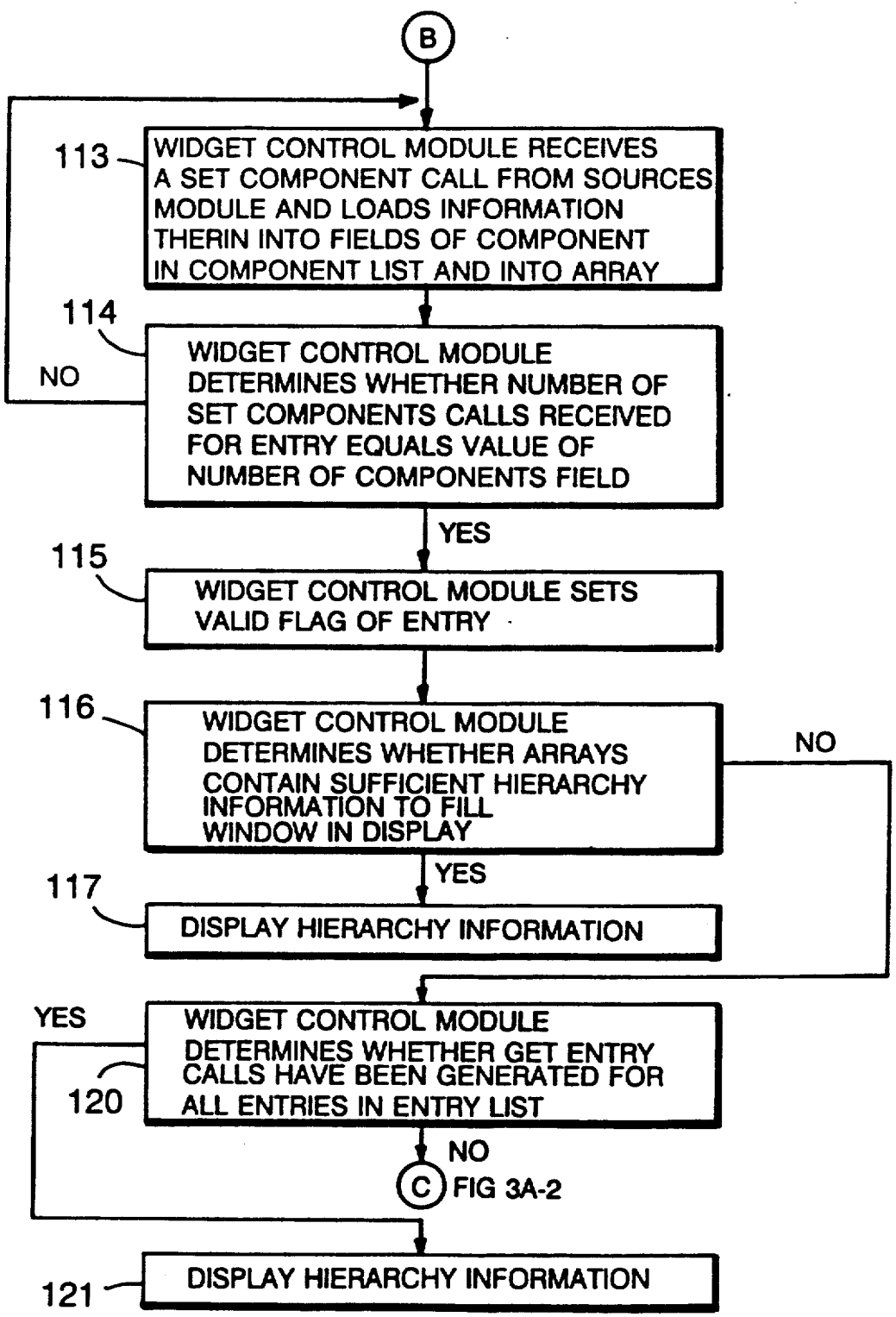

FIGS. 3A-1 through 3A-3 detail the operations performed in connection with creation of a widget. With reference to FIG. 3A-1, the applications module 12 first generates a CREATE WIDGET call to the widget control module 20, the call including a name for the widget, certain display information and callback pointers (step 100). The display information identifies a window in the screen (not shown) of the display 15 in which the widget control module 20 may display hierarchy information and other information depicting objects, most notably objects such as scroll bars. In response to the CREATE WIDGET call, the widget control module 20 creates the widget instance record 22 (step 101), storing the widget name in the call in the widget identification field 30 (FIG. 2), callback pointers in the callback pointers field 31, and display information in the display attribute information field 35. The widget control module 20 also establishes default display fonts for the various levels of hierarchy information which will be displayed, and loads values corresponding thereto in the level fonts field 3 (step 102).

The widget control module 20 then obtains hierarchy information from the source module 13 to display on the screen of display 15. In that operation, it generates the ATTACH callback for the source module 13, using the callback pointer therefor from the callback pointers field 31 (step 103). In the ATTACH callback, the widget control module 20 identifies the widget using the contents of the widget identification field 30 and provides an entry number of the first entry in an entry list 23 to be constructed. At this point the first entry has an entry number of zero.

In response to the ATTACH callback, the source module 13 generates an ADD ENTRIES call to the widget control module 20 to establish a first series of entries 24 in the entry list, as a step in providing hierarchy information associated therewith for display to the user. In the ADD ENTRIES call, the source module identifies the widget, and provides entry information including an entry number, a number of entries value, a level number and a set of entry tags corresponding to the number of entries value (step 104). The widget control module 20 then (step 105) establishes the entry list 23, linking it to the widget instance record 22 by establishing the value of the entry pointer 32 and the number of entries field 33. In establishing the entry list 23, the widget control module 20 first creates a series of entries 24, linking them together by means of the next pointer field 40 and previous pointer field, the number of entries 24 corresponding to the number of entries value in the ADD ENTRIES call.

After establishing the entry list 23 in response to the ADD ENTRIES CALL, the widget control module 20, in each entry, inserts a value in the level number fields 46 in all of the entries 24 corresponding to the level number value in the ADD ENTRIES call. Thus, if the source module 13 is to add entries associated with different hierarchy levels, it generates an ADD ENTRIES call for each level, as will be described below. In addition, in each entry 24 the widget control module 20 establishes the value of the entry tag field 47 from the entry tags received in the ADD ENTRIES call, with the consecutive entry tags from the ADD ENTRIES call being inserted into the fields 47 in the consecutive entries 24 in the entry list 23. In addition, the widget control module 20 initializes all of the valid flags 42, selected flags 43 and unselectable flags 44 in all of the entries 24 in the entry list to a reset condition.

After the widget control module 20 has established the entry list 23, it iteratively obtains hierarchy information associated with each of the entries 24 to display on display 15. To initiate each iteration, the widget control module 20 generates a GET ENTRY callback to the source module 13, including the entry number and the entry tag from entry tag field 40 of the entry 24 (step 106). In response, the source module generates a SET ENTRY call to the widget control module 20, including the widget name, the entry tag and number, display information, a value identifying the number of components of hierarchy information associated with the entry and a value that identifies the condition of the unselectable flag 44 (step 107).

The widget control module 2 receives the SET ENTRY call and loads the information therein into the respective fields of the entry 24 (step 110). That is, the widget control module 20 inserts the value identifying the number of components field into the field 52, the display information into field 50 and the unselectable flag value into the flag 44. The widget control module 20 then establishes a data structure for the component list 25, with a number of component entries corresponding to the value in the number of components field 52 in the entry 24. In addition, the widget control module 20 inserts a pointer to the data structure into the component pointer field 51 in entry 24.

The source module 13 then iteratively performs steps 111 and 112 to generate a number of SET COMPONENT calls corresponding to the number of components that were identified in the SET ENTRY call. The source module 13 includes in each SET COMPONENT call the entry number and the component number, and also includes a component type value, display attribute information and the hierarchy information. The component type value may identify, for example, whether the hierarchy information is in textual form or in graphical form.

In response to each SET COMPONENT call, the widget control module 20 stores the component type value and display information in the component entry 26 identified by the component number, in the component list 25 associated with (that is, pointed to by) the entry 24 identified by the entry number in the call (steps 113 and 114). The widget control module 20 establishes as a data structure an array 27 to contain the hierarchy information, and conditions the value of the array pointer 62 in the component entry 26 to link the array 27 to the component entry 26.

The widget control module 20, after receiving SET COMPONENT calls corresponding to the number of components in field 52 of the entry 24, sets the valid flag 42 in the entry 24 to indicate that its associated hierarchy information is available (step 115) and determines whether it has, in arrays 27, sufficient hierarchy information to fill the window in the display (step 116). If so, it sequences to step 117, in which it displays the hierarchy information and thereafter waits for an event indication from the event initiator 16.

If, on the other hand, the widget control module 20 determines in step 116 that it does not have sufficient hierarchy information to fill its window of the display 15, it sequences to step 120 in which it determines whether it has generated GET ENTRY calls for all of the entries 24 in the entry list 23. If so, it has exhausted the entries 24 and displays the hierarchy information it has in the arrays 27 (step 121). If not, it returns to step 106 to generate a GET ENTRY callback for the next entry 24.

It will be appreciated that the sequence depicted in FIGS. 3A-2 and 3A-3 essentially form two nested loops. In the outer loop, the widget control module 20 iteratively obtains information for the various entries 2 in the entry list, and is executed until either the widget control module 20 has sufficient information to fill its window of the display 15 or until information has been obtained for all of the entries 24 in the entry list. In the inner loop, the widget control module 20 iteratively obtains information for all of the components 25 in the component list associated with the entry 24 and the array 27 associated therewith.

b. Selection And Deselection

Figure 3B:
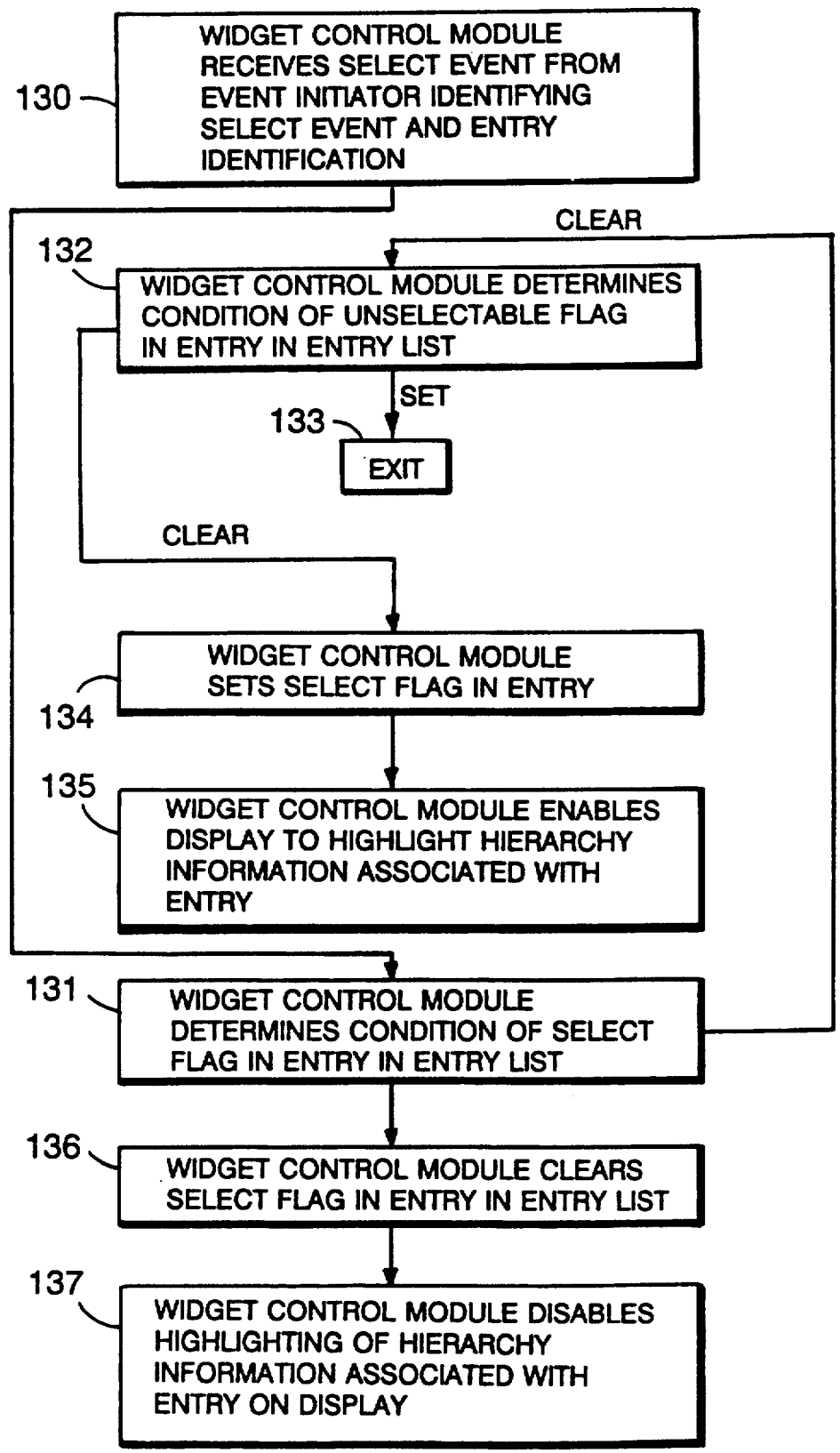

FIG. 3B depicts the operations performed by the widget control module 20 and source module 13 in response to a selection and deselection by the user initiated by the event initiator 16 of the user interface 14. The event initiator 16 essentially permits the use to toggle the selection status of an entry, as indicated by the condition of the selected flag 43 (FIG. 2) between the selected state and the deselected state. The event initiator 16, when it indicates a selection event, also provides information identifying an entry 24 in the entry list 23. In one embodiment, if the event initiator 16 is a mouse, the user initiates a selection event by moving the mouse pointer to an item of hierarchy information displayed on the screen of display 15 and depressing a button on the mouse. The event initiator identifies the location of the mouse pointer on the screen and the widget control module 20, from that location information, identifies the entry 24 associated therewith.

With reference to FIG. 3B, when the widget control module 20 receives a selection event from the event initiator, including information identifying the entry 24 selected (step 130), it first determines the condition of the selected flag 43 in the entry 24 in entry list 23. If the selected flag 43 is clear, the entry 24 is not selected and so the selection event is intended to select the entry. The widget control module 20 thus sequences to step 132 in which it tests the condition of the unselectable flag 44. If the widget control module 2 determines that the unselectable flag 44 is set, the entry 24 cannot be selected, and so the widget control module 20 exits (step 133).

On the other hand, if the widget control module 20 determines in step 132 that the unselectable flag is not set, the entry 24 can be selected and so it sequences to step 134 to set the selected flag 43 in the entry 24. The widget control module 20 then enables the display 15 to highlight the hierarchy information associated with entry 24 on the display screen (step 135), which may be accomplished by enabling the display 15 to display the hierarchy information in reverse video, and generates an ENTRIES SELECTED callback to the source module to identify the selected entries.

In one embodiment, only one entry 24 may be selected at a time, by means of a selection event. Accordingly, after the selection sequence depicted in steps 131 through 135, the widget control module 20 in that embodiment also sequence through the entry list 23 to clear the flags of any other entries whose selected flags 43 are set. Alternatively, the widget instance record 22 may include a field (not shown) which maintains a record of the identification of the selected entry 24, which may be used in clearing the selected flag 43 of an entry 24 when another entry is selected.

Returning to FIG. 3B, if, in step 131, the widget control module 20 determines that the selected flag 43 of the entry 24 to be selected is already set, the widget control module 20 sequences to step 136 to clear the entry's selected flag 43, thereby deselecting the entry 24. The widget control module 20 then disables the highlighting of the hierarchy information associated with the entry on the screen of the display 15 and generates an ENTRIES DESELECTED callback to the source module 13 identifying the deselected entries.

The applications program 11 may need to determine the identification of a selected entry 24 in response to a menu selection or other operation by the user. The applications program 11 may determine the identification by enabling the source module 13 to generate a NUM SELECTIONS call to the widget control module 20 to obtain the number of selected entries 24 from the widget control module 20. After receiving the number of selected entries from the widget control module, the source module establishes a buffer sufficient to hold the identifications of the entries selected, and generates a GET SELECTIONS call to the widget control module 20, including a pointer to the buffer. The widget control module 20 then inserts the identifications of the selected entries into the identified buffer. In response to a deselection of an entry 24, the widget control module 20 may generate an ENTRY UNSELECTED callback, identifying the deselected entry or entries 24.

c. Select And Confirm

Figures 1, 3C:
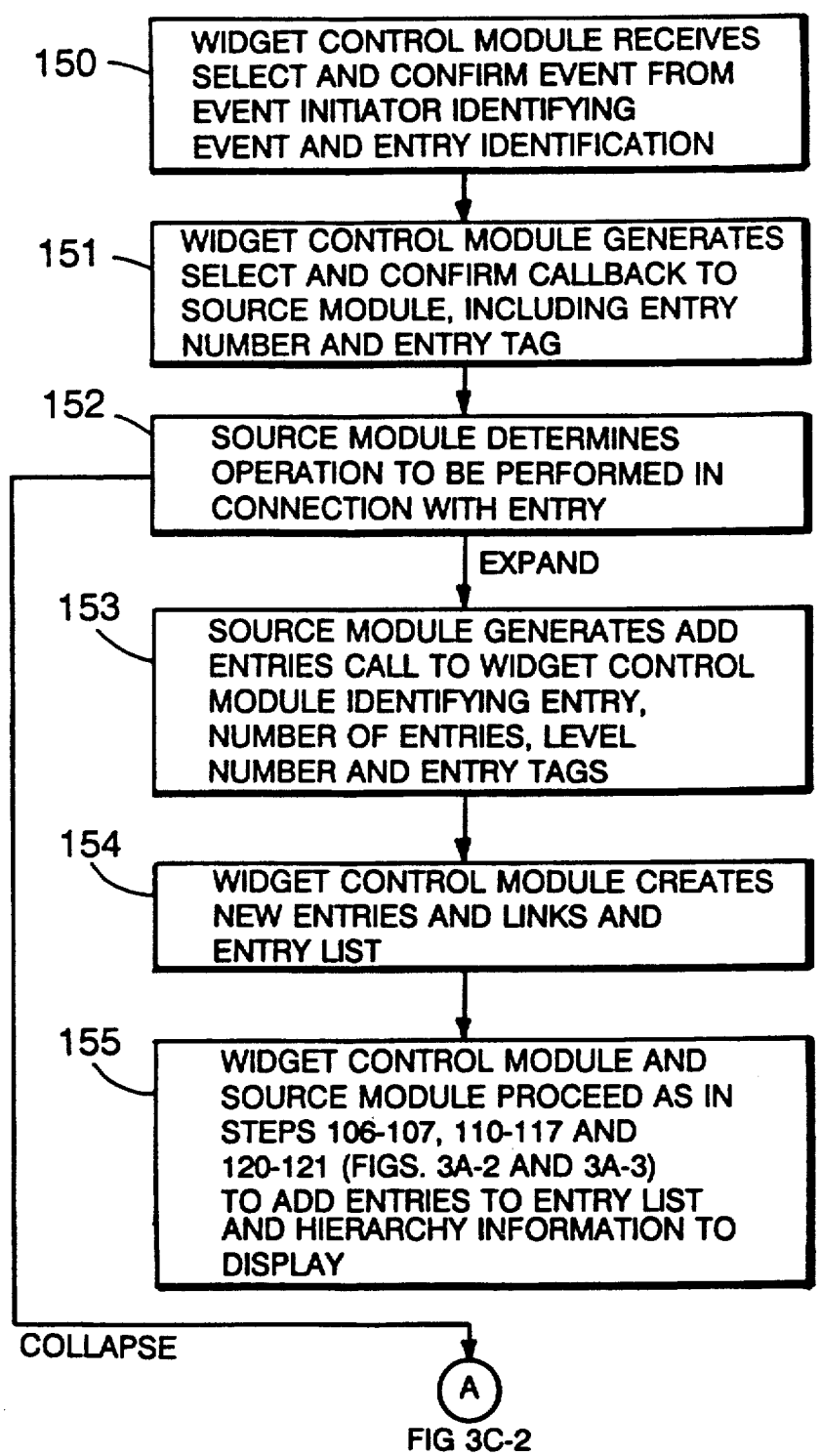
Figures 2, 3C:
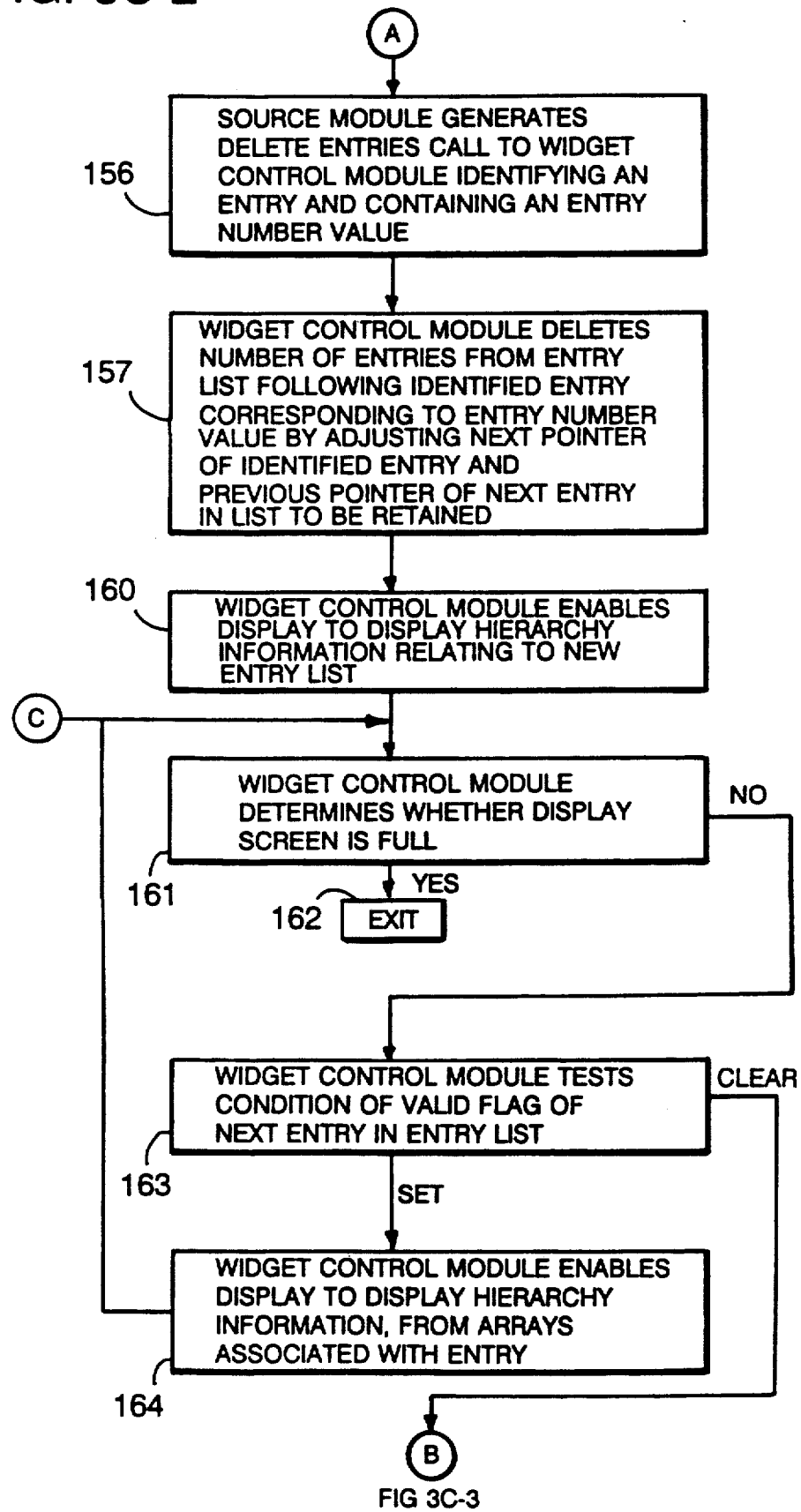

FIGS. 3C-1 through 3C-3 depict the operations performed by the widget control module 20 and source module 13 in response to a selection and confirmation operation by the user initiated by the event initiator 16 of the user interface 14. In one embodiment in which the event initiator 16 is a mouse, the user initiates a selection and confirmation event by moving the mouse pointer to an item of hierarchy information displayed on the screen of display 15 and depressing a button on the mouse twice in rapid succession. The event initiator identifies the location of the mouse pointer on the screen and the widget control module 20, from that location information, identifies the entry 24 associated therewith. In response to a selection and confirmation event, the widget control module 20 notifies the source module 13 of the event, which may initiate selected operations in response thereto. In one embodiment, the source module 13 enables the hierarchy information under the selected entry 24 to be toggled between expanded or collapsed or, if the entry 24 cannot be expanded or collapsed, it enables the contents of documents associated with the entry 24 to be displayed by the display 15.

With reference to FIG. 3C-1, the widget control module 20 initially receives the selection and confirmation event from the event initiator 16, identifying the event and the identification of an entry 24 (step 150). In response, the widget control module 20 generates a SELECT AND CONFIRM callback to the source module 13, including the entry number and the entry tag of the identified entry 24 (step 151).

The source module 13 then determines the operation to be performed in connection with the identified entry 24. If the operation is an expansion operation, the source module 13 generates an ADD ENTRIES call to the widget control module 20 to enable the widget control module 20 to add entries 24 to the entry list 23 following the identified entry 24 at the next level down in the hierarchy. Specifically, the ADD ENTRIES call identifies the entry 24 that was identified in the SELECT AND CONFIRM callback as the entry 24 after which the entries 24 are to be added. In addition, the ADD ENTRIES call identifies the number of entries, the level number, which is the next level from the identified entry 24, and entry tags. The widget control module 20 then creates the new entries 24 and links them into the entry list 23 following the identified entry 24 by adjusting the values in the pointer fields 40 and 41 in an appropriate manner. The widget control module 20 and source module 13 then proceed as depicted in FIGS. 3A-2 and 3A-3, using the GET ENTRIES callback and the SET ENTRY and SET COMPONENT calls, to obtain the hierarchy information relating thereto for display to the user.

If, in step 152, the source module 13 determines that the operation to be performed is a collapse operation, it sequences to step 156 (FIG. 3C-2) to generate a DELETE ENTRIES call to the widget control module 20. The DELETE ENTRIES call identifies an entry 24, specifically the entry 24 identified in the SELECT AND CONFIRM callback, and an entry number value. The widget control module 20 receives the DELETE ENTRIES call and deletes from the entry list the number of entries identified by the number entry value following the identified entry 24. The widget control module 20 accomplishes the deletion adjusting the value in the next pointer field 40 of the entry 24 identified in the DELETE ENTRIES call to point to the next entry 24 after the last entry to be deleted, and the value in the previous pointer field 41 of the next entry 24 after the last entry 24 to be deleted to point to the entry 24 identified in the DELETE ENTRIES call.

The widget control module 20 then initiates a series of steps, beginning with step 160, to refresh the display 15 so as to delete therefrom hierarchy information associated with the deleted entries, to iteratively obtain and display hierarchy information relating to each of the entries 24 newly linked to the entry 24 that was identified in the DELETE ENTRIES call so as to fill in the screen of display 15 after that entry, and, if necessary, to obtain hierarchy information relating to those entries to display. The widget control module 20 does not obtain hierarchy information relating to entries in the entry list 23 until it need it for the display.

Specifically, with reference to FIG. 3C-2, the widget control module 20 first determines whether its display screen window in display 15 is full (step 161). If it is, it exits (step 162). On the other hand, if the display screen window is not full, the widget control module 20 sequences to step 163 in which it tests the condition of the valid flag 42 of the next entry 24 in the entry list 23 (step 163). At this point, the next entry 24 is the entry 24 newly linked to the entry 24 that was identified in the DELETE ENTRIES call, that is, the entry 24 following which the entries were deleted. If the entry flag 42 of that entry is set, the arrays 27 associated therewith contain hierarchy information that can be displayed, and so the widget control module 20 sequences to step 164 to display the hierarchy information. The widget control module 20 then returns to step 161 for the next iteration.

If, on the other hand, the widget control module 20 determines in step 163 that the valid flag 42 of the entry 24 is clear, hierarchy information associated with the entry 24 is not available. Accordingly, the widget control module 20 initiates and, with source module 13, performs a sequence of operations depicted in steps 165 through 167 to obtain the hierarchy information associated with the entry 24, using the GET ENTRY callback and SET ENTRY and SET COMPONENT calls as described above.

The widget control module 20 and source module 13 performs the sequence of steps 161 through 167 until the widget control module 20 has sufficient hierarchy information to fill the display screen.

If the source module 13 determines, in step 152 that the entry 24 cannot be expanded or collapsed, it may transmit directly to the display 15 information, such as the contents of mail or other documents that may be identified by the entry 24, for display to the user.

d. Scroll Up Operation

Figures 1, 3D:
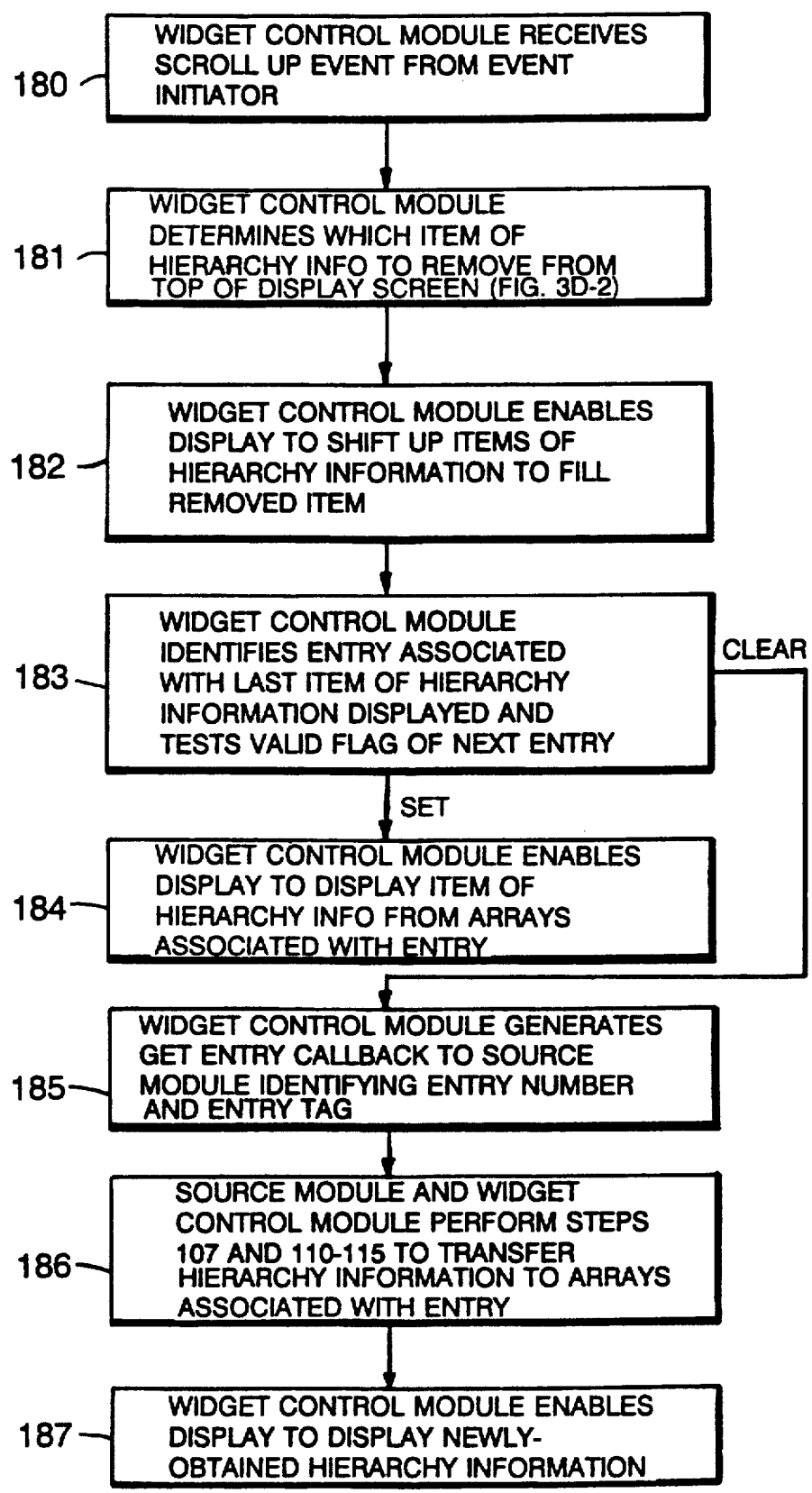
Figures 2A, 3D:
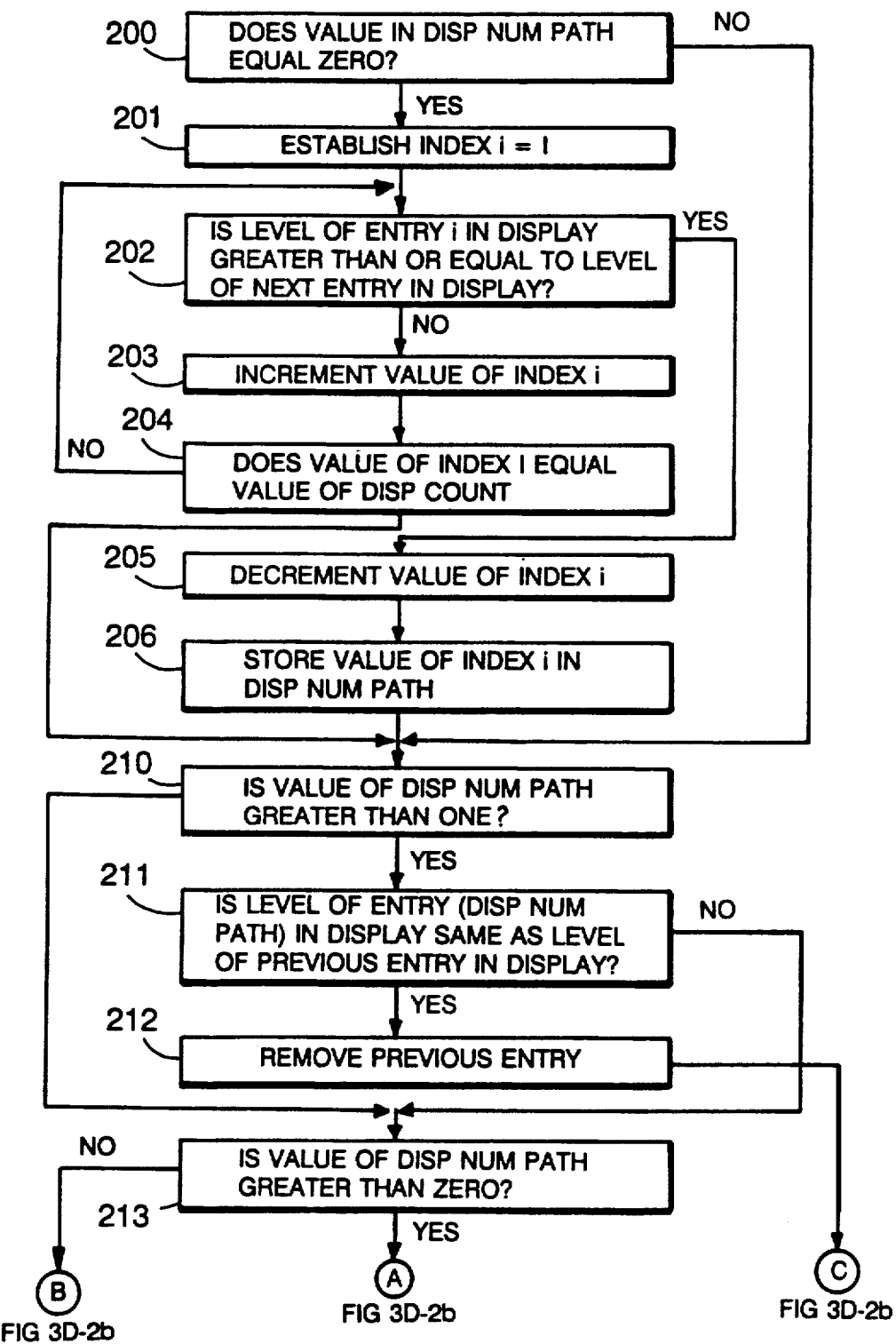
Figures 2B, 3D:
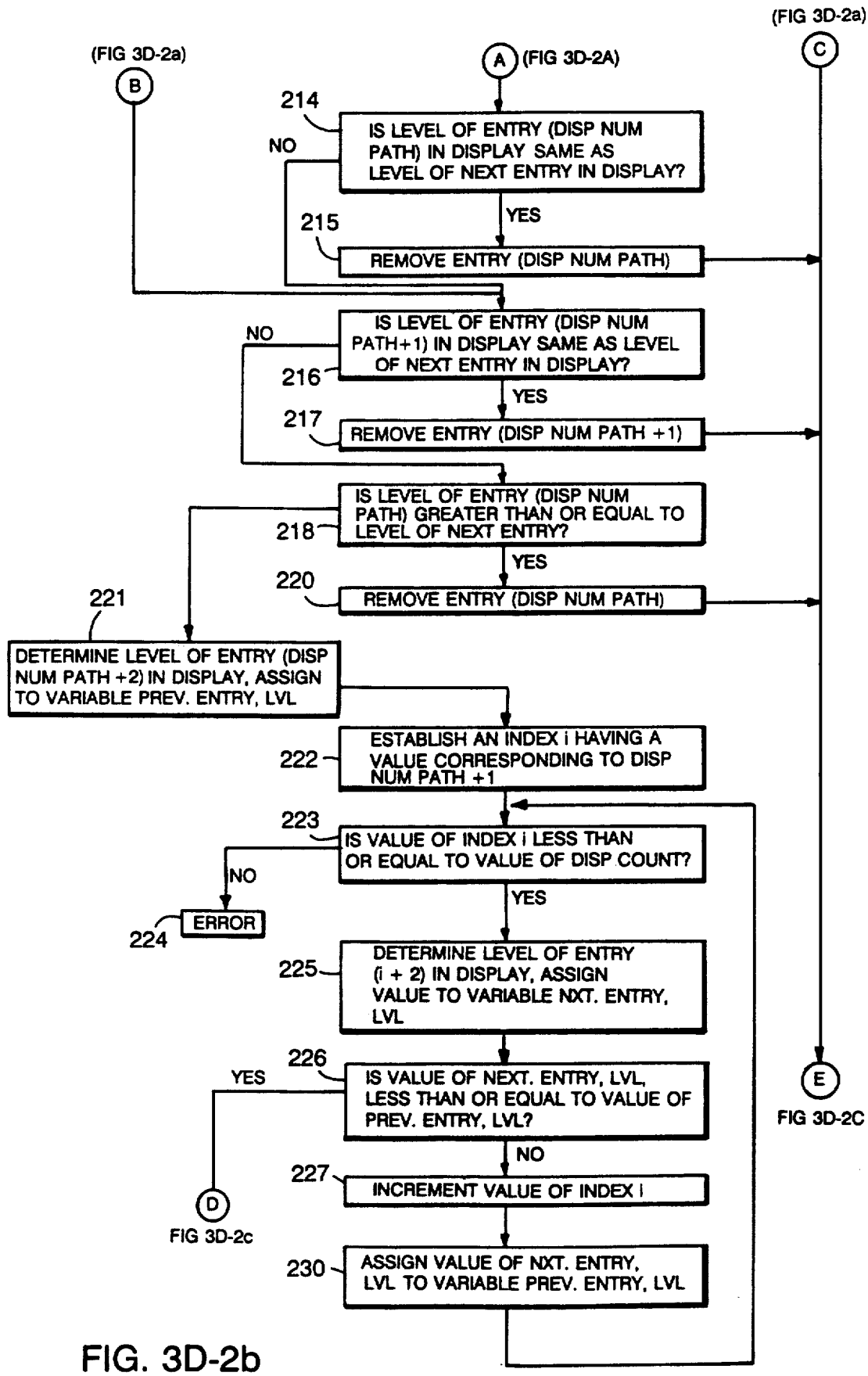
Figures 2C, 3D:
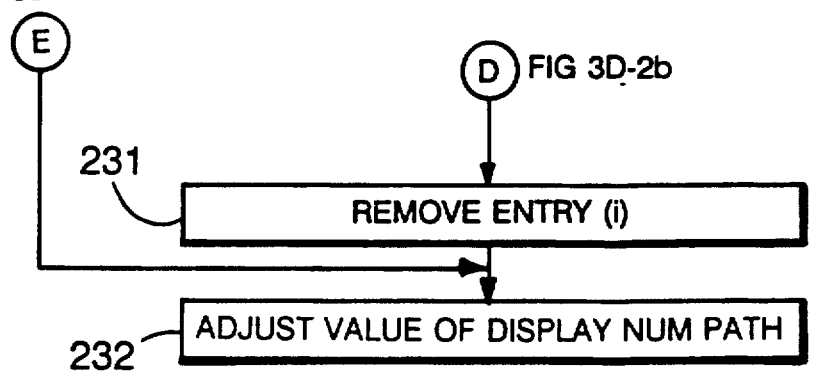

FIGS. 3D-1 through 3D-2c depict the operations performed by the widget control module 20 and source module in connection with a scroll up operation. The operations performed in connection with a scroll down operation will be described below beginning with FIG. 3E-1. To initiate a scroll up or scroll down operation, the event initiator 16 transmits an event identifying the scroll up or scroll down event as initiated by the user. In one specific embodiment in which the event initiator 16 is a mouse and which includes a scroll bar in the window associated with the widget instance record 22, a user may initiate a scrolling operation by manipulating the mouse pointer to either a scroll up pushbutton or a scroll down pushbutton on the ends of the scroll bar and depressing a button.

With reference to FIG. 3D-1, the widget control module 20, in response to the receipt of a scroll up event from the event initiator 16 (step 180), initially determines which item of hierarchy information displayed by display 15 is to be removed from the upper portion of the screen of display 15 (step 181). As noted above, the display 15 maintains the path up the tree-structured hierarchy to the root on the screen for the user, and so the widget control module 20 performs the sequence depicted in FIGS. 3D-2a through 3D-2c to determine which of the items to remove from the display screen. The widget control module 20 then enables the display 15 to shift up the items of hierarchy information following the removed item to fill in the display (step 182).

Following step 182, the widget control module 20 initiates a series of steps to add an item of hierarchy information to the bottom of the screen of display 15, which is the item associated with the next entry 24 after the entry 24 associated with the last item currently displayed. The widget control module 20 first identifies the entry 24 associated with the last item displayed on the screen and tests the valid flag 42 of the next entry 24 (step 183). In one embodiment, the display attribute information field 35 of the widget instance record 22 includes pointers to the entries 24 being displayed, and so the widget control module 20 can identify the last entry 24 pointed to by the pointers.

If, in step 183, the widget control module 20 determines that the valid flag 42 is set, it sequences to step 184 in which it enables the display 15 to display the hierarchy information in arrays 27 associated with the entry 24. On the other hand, if the widget control module 20 determines in step 183 that the valid flag 42 is clear, it initiates, and, with source module 13, performs a series of operations, depicted in steps 185 through 187 to obtain and display the item of hierarchy information associated with the entry 24.

As noted above, the widget control module 20 enables the display to display the path to the root of the tree-structured hierarchy of the hierarchical information structure. The operations initiated during a scroll up operation to accomplish this are depicted in FIGS. 3D-2a through 3D-2c. With reference to FIG. 3D-2a, and preliminarily, the widget control module 20 uses four data fields 190 through 194 all included in the display attributes information field 35 in widget instance record 22, to determine the entry 24 whose hierarchy information is to be removed during a scroll up or scroll down operation. Specifically, field 190 contains a value identifying the number of items of hierarchy information displayed by display 15 at the top of its screen and representing the path to the root of the information hierarchy. Field 191 identifies the maximum number of items of hierarchy information that can be displayed by the display 15. Field 192 contains pointers to entries 24 whose associated hierarchy information is currently being displayed, and field 193 identifies the number of items of hierarchy information currently being displayed. It will be appreciated that the value in field 193 also identifies the number of pointers in field 192.

With this background, to determine the item of hierarchy information to be removed during a scroll up operation, the widget control module 20 first performs a series of steps 200 through 206 to initialize the value stored in the display number path field 190, if it has not been previously initialized. If the value in the display number path field 190 has been previously initialized, the widget control module 20 proceeds to perform a series of tests, depicted in steps 210 through 217, 220 through 227 and 230 through 232 to identify an item to be removed.

Accordingly, the widget control module 20 first tests the value in the display number path field 190. If the value in field 190 is zero, the field has not been initialized, and so the widget control module 20 sequences to step 201 to begin initialization of the field. In that operation, the widget control module 20 iteratively compares the contents of the level number fields 46 of two successive of entries 24, after the first entry, whose hierarchy information is being displayed, and thus that are identified by the display entry pointers 192, to find a pair of successive entries in which the value stored in the level number field 46 of the second entry 24 in the pair is greater than the value stored in the level number field 46 of the first entry in the pair. If such a pair of entries is located, the path to root has been found and the value to be stored in the display number path field is related to the number of preceding entries 24 whose hierarchy information is being displayed.

Specifically, if the value in the display number path field 190 has not previously been initialized, the widget control module 20 initially establishes an index with an initial value of one (step 201). The index serves as a pointer into display entry pointers field 192. The widget control module 2 then tests the value in the level number field 46 of the entry 24 in the entry pointers field 192 identified by the index with the level number field 46 of the entry 24 identified by the next pointer in the entry pointers field (step 202). If the value in the level number field 46 of the entry 24 pointed to by the pointer identified by the index is not greater than or equal to the value of the level number field 46 of the entry pointed to by the next pointer, the widget control module 20 increments the value of the index (step 203) and compares the value of the index to the contents of the display count field, to determine whether entries 24 pointed to by all of the pointers in field 192 have been tested (step 204). If not, the widget control module 20 returns to step 202 to test the content of the level number field 46 of the entries 24 pointed to by the next two pointers in field 192.

If, during step 202, the widget control module 20 determines that the value in the level number field 46 of the entry 24 pointed to by the pointer identified by the index is greater than or equal to the value of the level number field 46 of the entry pointed to by the next pointer, the last entry in the path has been located. As a result, the widget control module 20 decrements the value of the index by one (step 205) and stores the value of the index in the display number path field 190 as its initial value. The value in the display number path field 190 at that point identifies the entry pointer in field 192 that points to the entry associated with the last item of displayed hierarchy information in the path to the root.

After the value in the display number path field 190 has been established, the widget control module 20 sequences to step 210 to begin a series of four operations to identify an entry 24 whose associated hierarchy information is to be removed from the display 15. In steps 210 through 212, the widget control module 20 determines whether the hierarchy level, indicated by the level number field 46, of the entry 24 identified by the pointer in field 192 that is, in turn, identified by the display number path field 190 is the same as the hierarchy level of the entry 24 identified by the previous pointer in field 192 (step 211). If so, the two entries are at the same level in the hierarchy and so the widget control module 20 removes the hierarchy information associated with the entry identified by the previous pointer in field 192 (step 212).

If the widget control module 20 does not remove hierarchy information in steps 210 through 212, it sequences to steps 213 through 215 in which it determines whether the hierarchy level of the entry 24 identified by the pointer in field 192 that is, in turn, identified by the pointer in display number path field 190 is the same as the level of the entry 24 identified by the next pointer in field 192. If so, the two entries 24 are at the same level in the hierarchy and so the widget control module 20 removes the hierarchy information associated with the entry identified by the pointer in field 192 that is identified by the value in the display number path field.

If the widget control module 20 does not remove hierarchy information in steps 213 through 215, it sequences to steps 216 and 217 in which it determines whether the entry 2 following the entries 24 identifying the path to the root should be removed. In that operation, the widget control module 20 determines whether the value in the level number field 46 of the entry 24 identified by the pointer in field 192 after the pointer identified by the value in the display number path field 190 is the same as the value in the level number field 46 of the entry 24 identified by the next pointer in field 192. If they are the same, the entries are at the same level in the hierarchy structure, and so the widget control module 20 removes the first entry 24, that is, the entry 24 identified by the pointer in field 192 after the pointer identified by the value in the display number path field 190.

If the widget control module 20 has not removed an item of hierarchy information by step 217, it steps to a sequence of steps 218, 220 through 227 and 230 through 231 in which it iteratively compares the hierarchy levels of pairs of entries 24 identified by successive pointers in field 192 to locate two in which the hierarchy level of the second entry is less than or equal to the hierarchy level of the first entry in the pair. When such a pair of entries 24 are located, the widget control module 20 removes the first entry in the pair.

Following all four tests, represented by steps 210 through 212, steps 214 and 215, steps 216 and 217 and steps 218, 220 through 227 and 230 through 231, respectively, the widget control module 20 sequences to step 232 to adjust the value in the display number path field 190 to identify the number of entries identified by pointers 192 which constitute the path to root hierarchy information.

e. Scroll Down Operation

Figures 1, 3E:
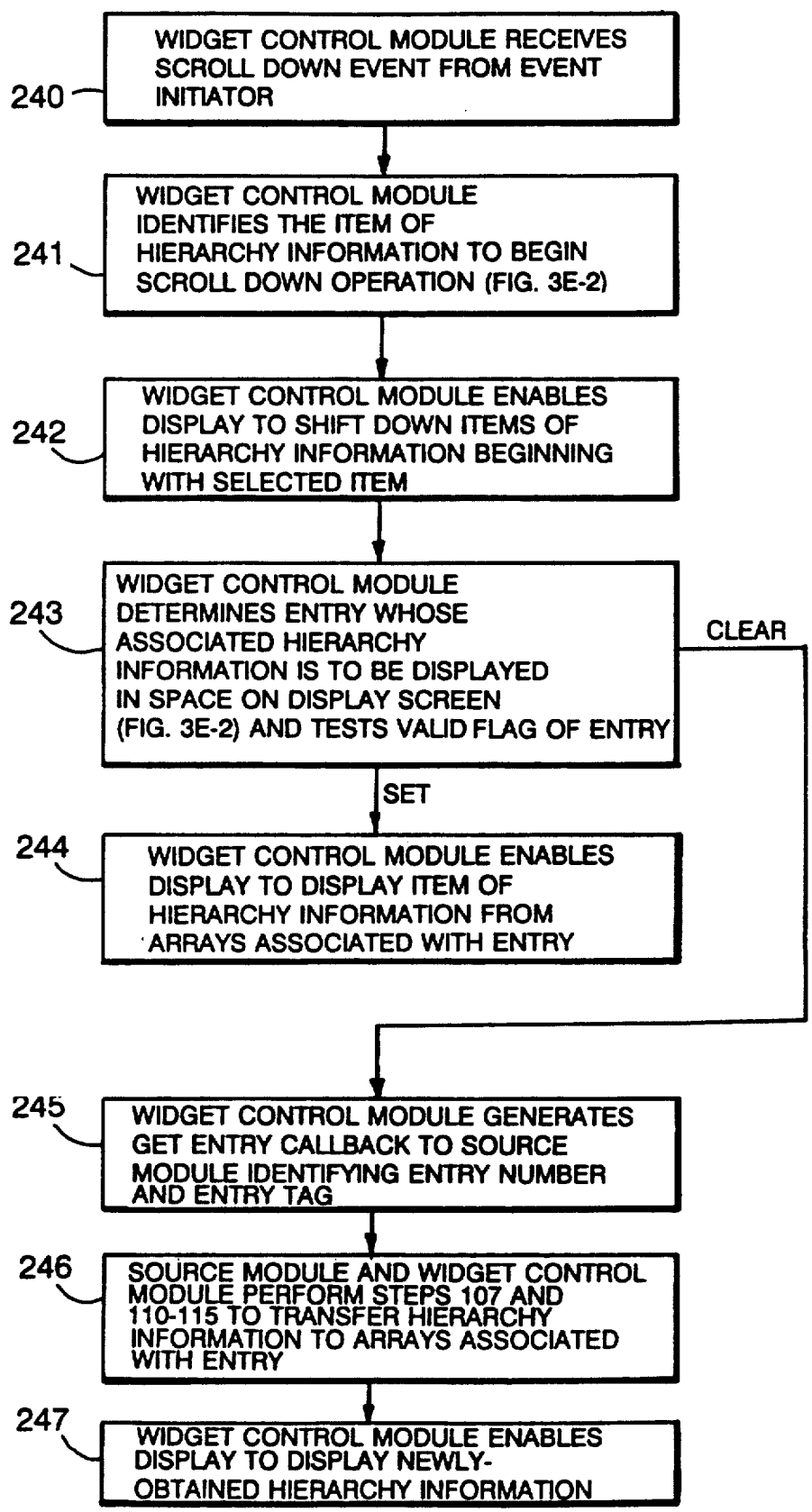
Figures 2A, 3E:
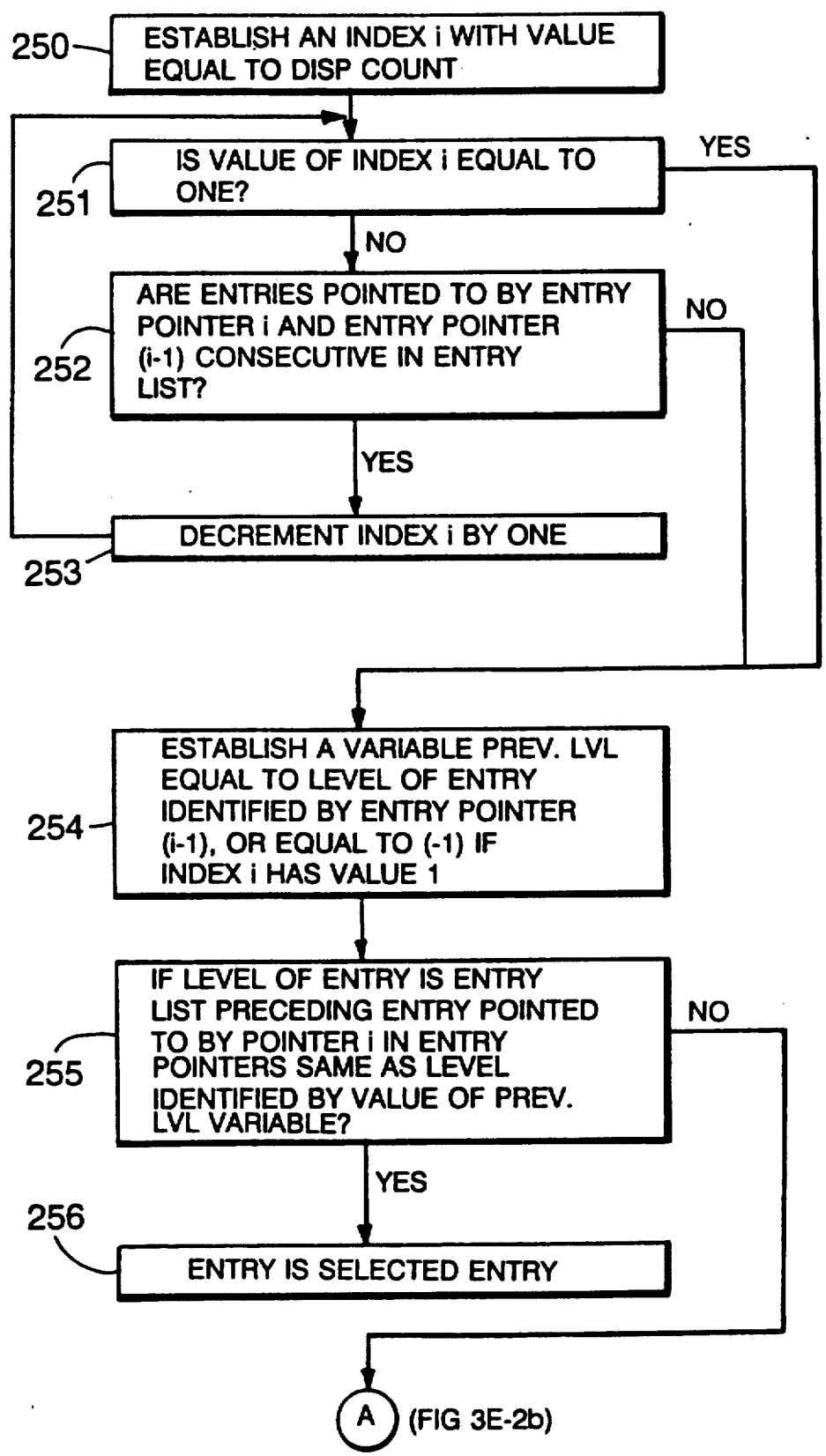
Figures 2B, 3E:
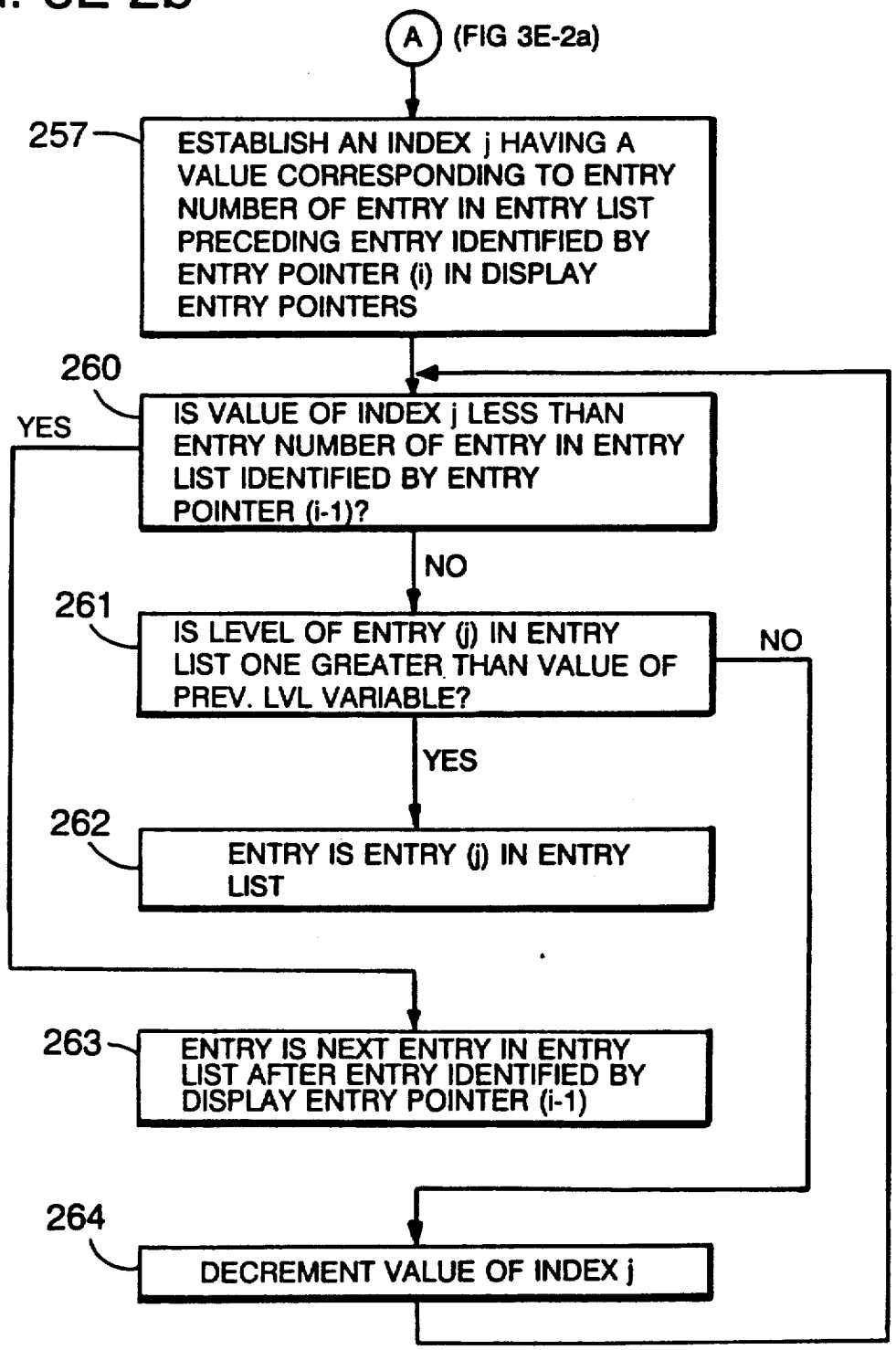

FIGS. 3E-1 through 3E-2b depict the operations performed by the widget control module 20 and source module in connection with a scroll down operation. With reference to FIG. 3E-1, when the widget control module 20 receives a scroll down event from the event initiator 16 (step 240) it first identifies the first item of hierarchy information to be shifted down on the screen of the display 15 (step 241). The sequence performed by the widget control module 20 in connection with that operation will be described in connection with FIGS. 3E-2a and 3E-2b. The widget control module 20 then enables the display 15 to shift down those items of hierarchy information, beginning with, and below, the item determined in step 241 (step 242), thereby creating a space on the display screen into which additional hierarchy information is inserted in the following steps.

Following step 242, the widget control module 20 identifies an entry 24 whose associated hierarchy information, in its associated arrays 27, is to be displayed in the space on the display screen created in step 242, and tests the valid flag 42 of that entry 24 is set to indicate that the hierarchy information has been previously supplied by the source module 13 and is available in arrays 27 (step 243). If the widget control module 20 determines that the entry's valid flag 42 is set, it enables the display 15 to display the hierarchy information in the array 27 on the display screen (step 244). If, on the other hand, the widget control module 20 determines that the entry's valid flag is not set, it and the source module 13 perform steps 245 through 247 to provide the hierarchy information for display.

As noted above, the widget control module 20, in steps 241 and 243, determines, first, the entries whose associated hierarchy information is to be shifted down on the display 15 and, second, an entry 24 whose hierarchy information is to be displayed in the space created thereby. Both of these operations are depicted on FIGS. 3E-2a and 3E-2b. With reference to FIG. 3E-2a, the sequence represented by steps 250 through 253 provides the identification of the first entry 24, identified by a pointer in display entry pointers 192, to be shifted down. Furthermore, the sequence represented by steps 254 through 257 and 260 through 263 provides the identification of an entry 24 in entry list 23 whose associated hierarchy information is to be displayed in the space left by the shift operation.

Accordingly, to identify the first entry 24 identified by display entry pointers in field 192 to be shifted down on the display 15, the widget control module 20 sequences backward, from the last display entry pointer in field 192 iteratively testing the sequence of the entries 24 in the entry list 23 to find the first pair of entries 24 that are not consecutive in the entry list 23. The hierarchy information associated with the second display entry pointer in the pair (that is, the one of the display entry pointers that points to the entry 24 whose associated hierarchy information is displayed later on the screen), and the hierarchy information associated with the subsequent entry pointers in field 192, are all shifted down on the display 15.

To accomplish this operation, the widget control module 20 first establishes an index i with a value corresponding to the value in the display count field 193 (step 250). The widget control module 20 uses the index i as a pointer into the display entry pointers field 192. If the widget control module 20 determines that value of the index i is not equal to one (step 251), it identifies the location of the entry 24 in the entry list 23 identified by the display index pointer that is, in turn, identified by the value of index i (step 252). In addition, the widget control module 20 determines the location of the entry 24 identified by the previous display entry pointer in field 192. If the two entries 24 are consecutive in the entry list 23, the widget control module 20 decrements the value of index i by one and returns to step 251. On the other hand, if the widget control module 20 determines in step 251 that the value of index i has been decremented to one, or if it determines that entries 24 identified by two consecutive pointers in the entry list 23 are not consecutive, the value of index i identifies the display entry pointer in field 192 that, in turn, points to the entry 24 whose associated hierarchy information is to be shifted down. In addition, the hierarchy information associated with entries identified by the subsequent entry pointers in the field 192 is to be shifted down as well.

When, in step 251, the widget control module 20 determines that the value of index i is equal to one, or, in step 252, it determines that two entries identified by consecutive display entry pointers in field 192 are not consecutive, it sequences to step 254. In steps 254 through 257 and 260 through 263, the widget control module 20 performs three tests to identify an entry 24 in entry list 23 whose associated hierarchy information is to be inserted into the space on display left by the shift down operation. In those operations, the widget control module 20 uses index i as determined in steps 250 through 253.

In the first test, the widget control module 20 selects the entry 24 preceding the first entry 24 whose associated hierarchy information was shifted down, if that entry 24 has the same hierarchy level, as indicated by the contents of its level number field 46, as the last entry 24 whose associated hierarchy information was not shifted down. Thus, in steps 254 through 256, the widget control module 20 determines whether the contents of the level number field 46 associated with the entry 24 preceding, in entry list 23, the entry 24 identified by the (i)th display index pointer in field 192, equal the contents of the level number field of the entry 24 identified by the (i-1)st display index pointer in field 192. If they do, the widget control module 20 selects that entry 24 as the one whose associated hierarchy information is to be displayed. In addition, the widget control module 20 adjusts the display entry pointers in the field 192 to identify the new sequence of entries being displayed.

If the first test fails, the widget control module 20 performs a sequence of steps 257 and 260 through 262 in which it steps rearwardly between the entries 24 in entry list 23 identified by the (i)th and (i-1)st display entry pointers to find one whose hierarchy level, as indicated by the contents of its level number field 46, is one greater than the hierarchy level of the entry 24 identified by the (i-1)st display entry pointer in field 192. If such an entry 24 exists, the widget control module 20 selects that entry 24 as the on whose associated hierarchy information is to be displayed and adjusts the display entry pointers in the field 192 to identify the new sequence of entries 24 being displayed.

Finally, if the second test fails, the widget control module 20 selects the entry 24 in entry list 23 following the entry 24 identified by the (i-1)st display entry pointer in field 192, and adjusts the display entry pointers in the field 192 to identify the new sequence of entries 24 being displayed.

f. Dragging Operations

Figure 3F:
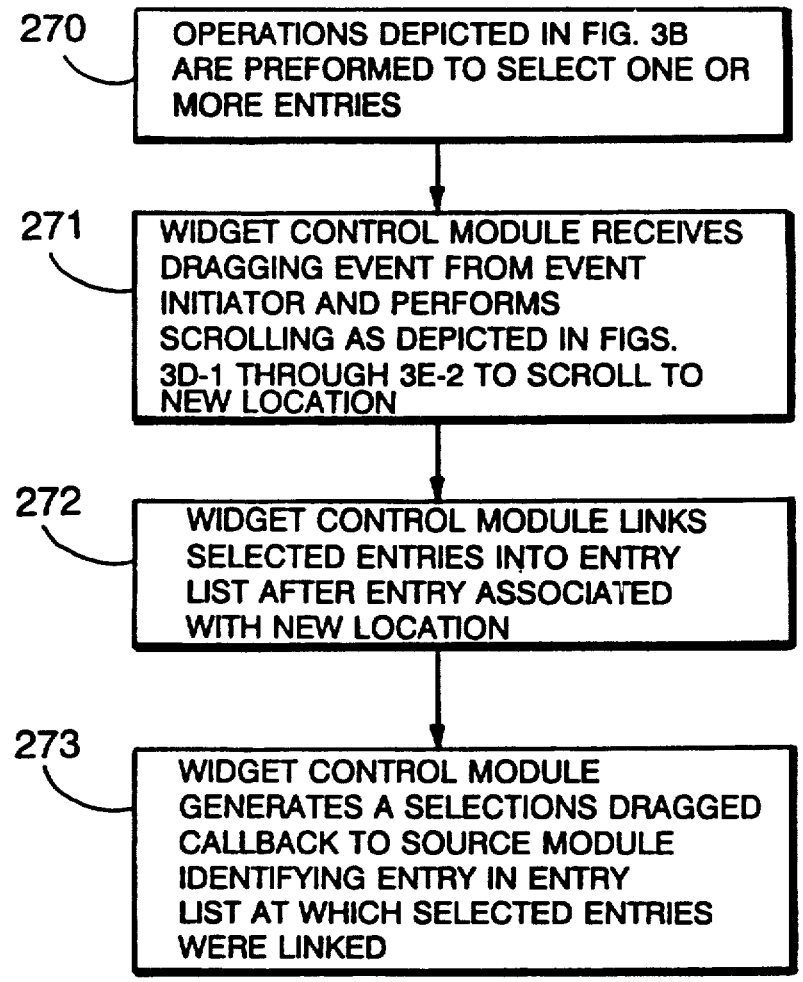

Finally, FIG. 3F depicts operations performed by the widget control module 20 in connection with a dragging operation initiated by the event initiator 16. In a dragging operation, one or more entries 24 is selected and, a pointer is manipulated so as to point to another entry. In response to the dragging operation, the selected entries 24 removed from their locations in the entry list 23 and linked into the entry list following the entry 24 pointed to by the pointer. In addition, the widget control module 20 enables the display 1 to display the entries 24 as listed in the entry list 23 after the completion of the linking operation.

With reference to FIG. 3F; the event initiator 16 and widget control module 20 first perform operations depicted in FIG. 3B to select one or more of the entries 24 (step 270). The widget control module 20 then receives the dragging event information from the event initiator (step 271). If manipulation of the pointer requires scrolling, the widget control module 20 enables scrolling as described above in connection with FIGS. 3D-1 through 3E-2.

After the event initiator 16 identifies an entry 24 after which the selected entries 24 are to be linked, the widget control module 20 performs the linking operation to remove the selected entries from their previous locations in the entry list 23 and link them into the entry list after the identified entry 24, and enables the display to display the entries 23 as set forth in the revised entry list 23 (step 272). The widget control module 20 then generates a SELECTIONS DRAGGED callback to the source module identifying the selected entries 24 and the entry 24 after which the selected entries were linked.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An outline management system adapted for use in conjunction with a user interface means including display means for displaying a portion of a multiple-level outline to a user and an input device for generating input information in response to use of said input device by a user, said outline management system comprising:

A. applications program means, comprising software, for organizing information stored in a computer database into a multiple-level outline including a plurality of outline items organized in a plurality of levels and for retrieving outline items from said outline in response to requests, and B. outline control means, interfacing with said applications program means and said user interface means, for receiving said input information from said user interface means, said input information indicating to said outline control means which outline items said user wishes to have displayed by said display means, for requesting and receiving, from said applications program means, outline items from a portion of said outline that said user wishes to have displayed by said display means, said received outline items being located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, said outline control means being adapted for use in conjunction with any of a plurality of differing applications program means, comprising software, that organize information that is stored in a computer database into an outline including a plurality of outline items organized in a plurality of levels, and that structure said outline in response to a multiple-level outline scheme, said outline control means requesting and receiving, from any of said plurality of applications program means, outline items that said user wishes to have displayed by said display means and that are located on a plurality of branches of said outline.

2. An outline management system as defined in claim 1 wherein:

said outline management system further comprises instance storage means for storing outline items, said outline control means receives outline items from said applications means and stores the outline items in said instance storage means; and said applications means includes means for generating a call to said outline control means to enable said outline control means to create said instance storage means.

3. An outline management system as defined in claim 2 wherein
   A. said instance storage means includes:
      i. entry list means including a plurality of entry means each for storing an outline item received from said applications means; and
      ii. instance means for identifying said entry list means; and
   B. said outline control means receives each outline item from said applications means and stores the outline item in a selected one of said entry means in said entry list means identified by said instance means.

4. An outline management system as defined in claim 3 wherein each said entry means includes valid flag means having selected conditions indicating whether it contains an outline item, said outline control means including
   A. entry display identification means for identifying entries whose outline items are to be displayed;
   B. valid flag testing means, responsive to said entry display identification means for identifying an entry, for testing the condition of said valid flag of said identified entry means;
   C. means for generating a callback to said applications means to obtain an outline item associated with said entry means in response to said valid flag testing means determining that the valid flag of said entry means indicates that said entry means does not contain an outline item.

5. An outline management system as defined in claim 3 wherein:
   A. said applications means includes means responsive to a callback from said outline control means requesting outline information for an entry means for generating a call identifying said entry means and an outline item; and
   B. said outline control means includes item storing means responsive to the receipt of said call for storing said outline item in said entry means and item display transmission means responsive to the operation of said item storing means for thereafter transmitting said outline item to said display means for display.

6. An outline management system as defined in claim 5 wherein said entry means includes storage pointer means for storing an information storage means pointer to an outline item storage means, said item storing means storing said outline item in said outline item storage means identified by said information storage means pointer.

7. An outline management system as defined in claim 6 wherein an outline item includes at least one component, said applications means generating a call including an entry means identification, a component entry means identification and said component;
   A. said outline item storage means including:
      i. an array storage means for storing a component; and
      ii. component list means containing a component entry means including an array pointer to said array storage means, said information storage means pointer pointing to said component list means;
   B. said outline control means including:
      i. component pointer retrieval means responsive to the receipt of a call from said applications means for retrieving said information storage means pointer from the entry means identified in said call;
      ii. array pointer retrieval means, responsive to said component pointer retrieval means for retrieving said information storage means pointer, for using said information storage means pointer to identify said component list means, retrieving said array pointer from the component means of the component list means identified by said component entry means identification, and storing the component in said array storage means.

8. An outline management system as defined in claim 7 in which said component entry means further includes a component type value, said display means using said component type value in its display operation.

9. An outline management system as defined in claim 3 wherein:
   A. said applications means includes means responsive to the receipt of an attach callback from said outline control means for generating an add entries call including a selected entry number value;

B. said outline control means includes:
  i. attach callback generating means responsive to said call from said applications means for generating an attach callback to said applications means; and
  ii. entry list creation means responsive to the receipt of said add entries call for establishing said entry list means, including a number of entries identified by said entry number value.

10. An outline management system as defined in claim 9 wherein said entry means further includes means for storing a level identification value, said add entries call further including a level value, said entry list creation means further storing the level value in each said entry means created in response to said add entries call.

11. An outline management system adapted for use in conjunction with a user interface means including display means for displaying outline items to a user and an input device for generating input information in response to use of said input device by a user, said outline management system comprising:
  A. applications program means, comprising software, for organizing information stored in a computer database into a multiple-level outline including a plurality of outline items organized in a plurality of levels and for retrieving outline items from said outline in response to requests, and
  B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means,
  wherein said outline management system further comprises instance storage means for storing outline items, and said outline control means receives outline items from said applications means and stores the outline items in said instance storage means, and said applications means includes means for generating a call to said outline control means to enable said outline control means to create said instance storage means,
  wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means,
  wherein said applications means includes means responsive to the receipt of an attach callback from said outline control means for generating an add entries call including a selected entry number value; and said outline control means includes attach callback generating means responsive to said call from said applications means for generating an attach callback to said applications means, and further includes entry list creation means responsive to the receipt of said add entries call for establishing said entry list means, including a number of entries identified by said entry number value,
  wherein said entry means further includes means for storing a level identification value, said add entries call further including a level value, said entry list creation means further storing the level value in each said entry means created in response to said add entries call, and
  wherein said instance storage means includes instance means for identifying said entry list means, said instance means including means for identifying a display font value associated with each outline level, said outline control means including display control means comprising:
    A. display information retrieval means for retrieving outline information from respective entry means;
    B. display image generation means for generating image information for said entry means in response to the outline information from said entry means, the level value in said entry means, and the display font value associated with said level value; and
    C. display image transmission means for transmitting the image information for said entry means to said display.

12. An outline management system as defined in claim 11 wherein said instance means further includes means for identifying a display object, said display image generation means further generating image information representative of said identified display object for transmission by said display image transmission means.

13. An outline management system adapted for use in conjunction with a user interface means including display means for displaying outline items to a user and an input device for generating input information in response to use of said input device by a user, said outline management system comprising:
  A. applications program means, comprising software, for organizing information stored in a computer database into a multiple-level outline including a plurality of outline items organized in a plurality of levels and for retrieving outline items from said outline in response to requests, and
  B. outline control means, interfacing with said applications program means and said user interface means, for receiving said input information from said user interface means, said input information indicating to said outline control means which outline items said user wishes to have displayed by said display means for requesting and receiving, from said applications program means, outline items that said user wishes to have displayed by said display means and that are located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, wherein said outline management system further comprises instance storage means for storing outline items, and said outline control means receives outline items from said applications means and stores the items in said instance storage means, and said applications means includes means for generating a call to said outline control means to enable said outline control means to create said instance storage means, wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means, wherein:
- A. said input device includes means for generating selecting information identifying an entry,
- B. each entry means in said entry list means includes a selected flag having selected conditions indicating a selection condition and an unselected condition; and
- C. said outline control means includes selected flag conditioning means for receiving said selection information and for conditioning said selected flag of the entry means identified by said selection information.

14. An outline management system as defined in claim 13 wherein said selected flag conditioning means further conditions said selected flag in response to the condition of said selected flag.

15. An outline management system as defined in claim 13 wherein each said entry means further includes an unselectable flag having selected conditions, said selected flag conditioning means being disabled in response to said unselectable flag having selected conditions.

16. An outline management system as defined in claim 13 wherein said outline control means further includes means for generating a callback to said applications means in response to receipt of said selection information.

17. An outline management system adapted for use in conjunction with a user interface means including display means for displaying outline items to a user and an input device for generating input information in response to use of said input device by a user, said outline management system comprising:
- A. application program means, comprising software, for organizing information stored in a computer database into a multiple-level outline including a plurality of outline items organized in a plurality of levels and for retrieving outline items from said outline in response to requests, and
- B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, wherein said outline management system further comprises instances storage means for storing outline items, and said outline control means receives outline items from said applications means and stores the outline items in said instance storage means, and said applications means includes means for generating a call to said outline control means to enable said outline control means to create said instance storage means, wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means, wherein:
- A. said input device includes means for generating selection and confirmation information identifying an entry;
- B. said outline control means includes means for generating a callback to said applications means in response to receipt of said selection and confirmation information, said callback identifying an entry; and
- C. said applications means includes selection and confirmation response means for responding to the receipt of said selection and confirmation information.

18. An outline management system as defined in claim 17 in which:
- A. said selection and confirmation response means includes means for generating an add entries call in response to said callback, said add entries call including an entry means identification, an entry number value and a level value; and
- B. said outline control means includes add entry means responsive to said add entries call for creating additional entry means, corresponding to said entry number value, in said entry list following the entry means identified by said entry means identification, each of said additional entry means including level identification value storage means for receiving said level value.

19. An outline management system as defined in claim 18 in which said entry list comprises a linked list of said entry means, each entry means including a next entry pointer identifying the next entry means in the list, said add entry means establishing the contents of said next entry pointer in said entry means identified by said entry means identification in said add entries call to identify the first of said additional entries, and establishing the contents of the last of said additional entries to identify the next entry means in the entry list to thereby link said additional entries into said entry list.

20. An outline management system as identified in claim 17 in which:
   A. said selection and confirmation response means includes means for generating a delete entries call in response to said callback, said delete entries call including an entry means identification and an entry number value; and
   B. said outline control means includes delete entry means responsive to said delete entries call for deleting entry means, corresponding to said entry number value, from said entry list following the entry means identified by said entry means identification.

21. An outline management system as defined in claim 20 in which said entry list comprises a linked list of said entry means, each entry means including a next entry pointer identifying the next entry means in the list, said delete entry means establishing the contents of said next entry pointer in said entry means identified by said entry means identification in said delete entries call to identify the entry means in said entry list subsequent to the identified entry means corresponding to said entry number value.

22. An outline management system adapted for use in conjunction with a user interface means including display means for displaying outline items to a user and an input device for generating input information in response to use of said input device by a user, said outline management system comprising:
   A. applications program means, comprising software, for organizing information stored in a computer database into a multiple-level outline including a plurality of outline items organized in a plurality of levels and for retrieving outline items from said outline in response to requests, and
   B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means,
   wherein said outline management system further comprises instance storage means for storing outline items, and said outline control means receives outline items from said applications means and stores the outline items in said instance storage means, and said applications means includes means for generating a call to said outline control means to enable said outline control means to create said instance storage means,
   wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means,
   wherein:
   A. said input device generates scrolling information, and
   B. said outline control means transmits selected outline items to said display means for display, said outline control means adjusting the selection of the outline items transmitted for display in response to said scrolling information from said input device.

23. An outline management system as defined in claim 22 wherein each entry means in said entry list includes valid flag means having selected conditions indicating whether it contains an outline item, said outline control means including:
   A. entry display identification means for identifying an entry means in response to said scrolling information;
   B. valid flag testing means responsive to said entry display identification means identifying an entry for testing the condition of said valid flag of said identified entry means;
   C. means for generating a callback to said applications means to obtain an outline item associated with said entry means in response to said valid flag testing means determining that the valid flag of said entry means indicates that said entry means does not contain an outline item.

24. An outline management system as defined in claim 22 wherein said scrolling information includes scroll up information, said entry display identification means including entry display deletion means responsive to said scroll up information for selecting an entry means whose associated outline information is to be deleted from said selected outline items transmitted to said display means.

25. An outline management system as defined in claim 24 wherein each entry means includes means for storing a level identification value, said entry display deletion means including:
   A. display entry pointer means for storing pointers identifying entries whose associated outline information is being transmitted for display on said display means;
   B. path identification storage means for storing a value identifying a pointer in said display entry pointer means whose outline items correspond to a path to the root of the outline information transmitted for display on said display means;
   C. entry deletion identification means responsive to the contents of said path identification means and said display entry pointer means for comparing the level identification values of said entry means proximate the entry means pointed to by the pointer identified by the contents of said path identification storage means to identify an entry whose associated outline item is to be deleted.

26. An outline management system as defined in claim 25 wherein said entry deletion identification means includes:
   A. first scroll up test means for comparing the level identification value of the entry means identified by the pointer in said display entry pointer means identified by the pointer in said path identification storage means with the level identification value of the entry means identified by the previous pointer in said display entry pointer means and for deleting the outline item associated with the entry means identified by the previous pointer in response to a predetermined comparison result;
   B. second scroll up test means responsive to another predetermined comparison result by said first scroll up test means for comparing the level identification value of the entry means identified by the pointer in said display entry pointer means identified by the pointer in said path identification storage means with the level identification value of the entry means identified by the next pointer in said display entry pointer means and for deleting the outline item identified by the pointer in response to a predetermined comparison result;
   C. third scroll up test means responsive to another predetermined comparison result by said second scroll up test means for comparing the level identification value of the entry means identified by the first pointer in said display entry pointer means after the pointer identified by the pointer in said path identification storage means with the level identification value of the entry means identified by the next pointer in said display entry pointer means and for deleting the outline item identified by the second pointer in response to a predetermined comparison result; and
   D. fourth scroll up test means responsive to another predetermined comparison result by said third scroll up test means for iteratively comparing the level identification values of the entry means identified by pairs of two succeeding pointers in said display entry pointer means after the pointer identified by the pointer in said path identification storage means and for deleting the outline item identified by the first pointer in a pair in response to a predetermined comparison result.

27. An outline management system as defined in claim 22 wherein said scrolling information includes scroll down information, said entry display identification means including scroll down entry display deletion means responsive to said scroll down information for selecting an entry means whose associated outline information is to be deleted from said selected outline items transmitted to said display means.

28. An outline management system as defined in claim 27 wherein each entry means includes means for storing a level identification value, said scroll down entry display deletion means including:
   A. consecutive entry comparison means for iteratively testing two consecutive entries whose associate outline items are being transmitted to said display means for display, beginning from the entry means associated with the last outline item transmitted, to identify two entry means that are not consecutive in said entry list; and
   B. scroll down entry identification means responsive to the identification by said consecutive entry comparison means identification for specifying an entry means in said entry list between said two identified entry means whose associated outline item is to be transmitted to said display means for display.

29. An outline management system as defined in claim 28 in which:
   A. said entry comparison means includes:
      i. index storage means for storing an index value initially identifying the number of entry means whose associated outline items are being transmitted to said display means for display;
      ii. display entry pointer means for storing pointers identifying entries whose associated outline information is being transmitted for display on said display means;
      iii. scroll down comparison means for iteratively determining the location, in said entry list, of said entry means identified by the pointer in said display entry pointer means identified by said index storage means to the location of said entry means identified by the previous pointer in said display entry pointer means to determine whether they are consecutive; and
      iv. decrement means for decrementing said index value in said index storage means in response to a negative determination by said scroll down comparison means;
   B. said scroll down entry identification means includes:
      i. first scroll down test means responsive to a positive determination by said scroll down identification means for comparing (a) the level identification value of said entry means identified by the pointer in said display entry pointer means previous to the pointer identified by said index value, to (b) the level identification value of said entry means in the entry list means previous to the entry means identified by the pointer in said display entry pointer means identified by said index value, and for specifying said entry means identified by the pointer in said display entry pointer means previous to the pointer identified by said index value as said entry means whose associated outline item is to be transmitted to said display means if said level identification values are the same;
      ii. second scroll down test means responsive to a negative comparison by said first scroll down test means for iteratively comparing (a) the level identification value of said entry means identified by the pointer in said display entry pointer means previous to the pointer identified by said index value, to (b) the level identification value of said entry means in the entry list means previous to the entry means identified by the pointer in said display entry pointer means identified by said index value, and for specifying said entry means identified by the pointer in said display entry pointer means previous to the pointer identified by said index value as said entry means whose associated outline item is to be transmitted to said display means if said level identification values differ by a selected value; and
      iii. third scroll down test means responsive to a negative comparison by said second scroll down test means for specifying the entry means in said entry list means following said entry means identified by the pointer in said display entry pointer means previous to the pointer identified by said index value as the said entry means whose associated outline item is to be transmitted to said display means.

30. An outline management system adapted for use in conjunction with any of a plurality of differing applications program means comprising software that organize information stored in a computer database into a multiple-level outline including a plurality of outline items organized in a plurality of levels and that retrieve outline items from said outline in response to requests, and adapted for use in conjunction with a user interface means including display means for displaying a portion of said outline to a user and an input device for generating input information in response to use of said input device by a user, said outline management system comprising:
  A. instance storage means for storing outline items organized in said plurality of levels; and
  B. outline control means interfacing with said applications program means and said user interface means, for receiving said input information from said user interface means, said input information indicating to said outline control means which outline items said user wishes to have displayed by said display means, for requesting and receiving, from said applications program means, outline items from a portion of said outline that said user wishes to have displayed by said display means, said received outline items being located on a plurality of branches of said outline, for storing said received outline items located on a plurality of branches of said outline in said instance storage means, and for transmitting received and stored outline items located on a plurality of branches of said outline to said display means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means.

31. An outline management system as defined in claim 30 wherein
  A. said instance storage means includes:
    i. entry list means including a plurality of entry means each for storing an outline item received from said applications means; and
    ii. instance means for identifying said entry list means; and
  B. said outline control means receives outline items from said applications means and stores the outline items in a selected one of said entry means in said entry list means identified by said instance means.

32. An outline management system as defined in claim 31 wherein each said entry means includes valid flag means having selected conditions including whether it contains an outline item, said outline control means including
  A. entry display identification means for identifying entries whose outline items are to be displayed;
  B. valid flag testing means, responsive to said entry display identification means for identifying an entry, for testing the condition of said valid flag of said identified entry means;
  C. means for generating a callback to said applications means to obtain an outline item associated with said entry means in response to said valid flag testing means determining that the valid flag of said entry means indicates that said entry means does not contain an outline item.

33. An outline management system as defined in claim 31 wherein said applications means includes means responsive to a callback from said outline control means requesting outline information for an entry means for generating a call identifying said entry means and an outline item, said outline control means further including item storing means responsive to the receipt of said call for storing said outline item in said entry means and item display transmission means responsive to the operation of said item storing means for thereafter transmitting said outline item to said display means for display.

34. An outline management system as defined in claim 33 wherein said entry means includes storage pointer means for storing an information storage means pointer to an outline item storage means, said item storing means storing said outline item in said outline item storage means identified by said information storage means pointer.

35. An outline management system as defined in claim 34 wherein an outline item includes at least one component, said applications means generating a call including an entry means identification, a component entry means identification and said component;
  A. said outline item storage means including:
    i. an array storage means for storing a component; and
    ii. component list means containing a component entry means including an array pointer to said array storage means, said information storage means pointer pointing to said component list means;
  B. said outline control means including:
    i. component pointer retrieval means responsive to the receipt of a call from said applications means for retrieving said information storage means pointer from the entry means identified in said call;
    ii. array pointer retrieval means, responsive to said component pointer retrieval means for retrieving said information storage means pointer, for using said information storage means pointer to identify said component list means, retrieving said array pointer from the component means of the component list means identified by said component entry means identification, and storing the component in said array storage means.

36. An outline management system as defined in claim 35 in which said component entry means further includes a component type value, said display means using said component type value in its display operation.

37. An outline management system as defined in claim 31 wherein said applications means includes means responsive to the receipt of an attach callback from said outline control means for generating an add entries call including a selected entry number value, said outline control means further including;
  A. attach callback generating means responsive to said call from said applications means for generating an attach callback to said applications means; and B. entry list creation means responsive to the receipt of said add entries call for establishing said entry list means, including a number of entries identified by said entry number value.

38. An outline management system as defined in claim 37 wherein said entry means further includes means for storing a level identification value, said add entries call further including a level value, said entry list creation means further storing the level value in each said entry means created in response to said add entries call.

39. An outline management system as defined in claim 31 wherein said input device includes means for generating selection and confirmation information identifying an entry, said outline control means further including means for generating a callback to said applications means in response to receipt of said selection and confirmation information, said callback identifying an entry, and said applications means includes selection and confirmation response means for responding to the receipt of said selection and confirmation information for generating an add entries call in response to said callback, said add entries call including an entry means identification, an entry number value and a level value, said outline control means including add entry means responsive to said add entries call for creating additional entry means, corresponding to said entry number value, in said entry list following the entry means identified by said entry means identification, each of said additional entry means including level value storage means for storing a level identification value for receiving said level value.

40. An outline management system as defined in claim 39 in which said entry list comprises a linked list of said entry means, each entry means including a next entry pointer identifying the next entry means in the list, said add entry means establishing the contents of said next entry pointer in said entry means identified by said entry means identification in said add entries call to identify the first of said additional entries, and establishing the contents of the last of said additional entries to identify the next entry means in the entry list to thereby link said additional entries into said entry list.

41. An outline management system as identified in claim 39 in which said applications means generates a delete entries call in response to said callback, said delete entries call including an entry means identification and an entry number value, said outline control means includes delete entry means responsive to said delete entries call for deleting entry means, corresponding to said entry number value, from said entry list following the entry means identified by said entry means identification.

42. An outline management system as defined in claim 41 in which said entry list comprises a linked list of said entry means, each entry means including a next entry pointer identifying the next entry means in the list, said delete entry means establishing the contents of said next entry pointer in said entry means identified by said entry means identification in said delete entries call to identify the entry means in said entry list subsequent to the identified entry means corresponding to said entry number.

43. An outline management system adapted for use in conjunction with an applications program means comprising software that organizes information stored in a computer database into a multiple-level outline including a plurality of outline items organized in a plurality of levels and that retrieves outline items from said outline in response to requests, and adapted for use in conjunction with a user interface means including display means for displaying outline items to a user and an input device for generating input information in response to use of said input device by a user, said outline management system comprising:

A. instance storage means for storing outline items organized in said plurality of levels; and B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, for storing said received outline items located on a plurality of branches of said outline in said instance storage means, and for transmitting received and stored outline items located on a plurality of branches of said outline to said display means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means, wherein said applications means includes means responsive to the receipt of an attach callback from said outline control means for generating an add entries call including a selected entry number value; and said outline control means includes attach callback generating means responsive to said call from said applications means for generating an attach callback to said applications means, and further includes entry list creation means responsive to the receipt of said add entries call for establishing said entry list means, including a number of entries identified by said entry number value, wherein said entry means further includes means for storing a level identification value, said add entries call further including a level value, said entry list creation means further storing the level value in each said entry means created in response to said add entries call, and wherein said instance means further includes means for identifying a display font value associated with each outline level, said outline control means including display control means comprising:

A. display information retrieval means for retrieving outline information from respective entry means;

B. display image generation means for generating image information for said entry means in response to the outline information from said entry means, the level value in said entry means and the display font value associated with said level value; and C. display image transmission means for transmitting the image information for said entry means to said display.

44. An outline management system as defined in claim 43 wherein said instance means further includes means for identifying a display object, said display image generation means further generating image information representative of said identified display object for transmission by said display image transmission means.

45. An outline management system adapted for use in conjunction with an applications program means comprising software that organizes information stored in a computer database into a multiple-level outline including a plurality of outline items organized in a plurality of levels and that retrieves outline items from said outline in response to requests, and adapted for use in conjunction with a user interface means including display means for displaying outline items to a user and an input device for generating input information in response to use of said input device by a user, said outline management system comprising:

A. instance storage means for storing outline items organized in said plurality of levels; and B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, for storing said received outline items located on a plurality of branches of said outline in said instance storage means, and for transmitting received and stored outline items located on a plurality of branches of said outline to said display means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means, wherein:

A. said input device includes means for generating selection information identifying an entry, B. each entry means in said entry list means includes a selected flag having selected conditions indicating a selection condition and an unselected condition; and C. said outline control means includes selected flag conditioning means for receiving said selection information and for conditioning said selected flag of the entry means identified by said selection information.

46. An outline management system as defined in claim 45 wherein said selected flag conditioning means further conditions said selected flag in response to the condition of said selected flag.

47. An outline management system as defined in claim 45 wherein each said entry means further includes an unselectable flag having selected conditions, said selected flag conditioning means being disabled in response to said unselectable flag having selected conditions.

48. An outline management system as defined in claim 45 wherein said outline control means further includes means for generating a callback to said applications means in response to receipt of said selection information.

49. An outline management system adapted for use in conjunction with an applications program means comprising software that organizes information stored in a computer database into a multiple-level outline including a plurality of outline items organized in a plurality of levels and that retrieves outline items from said outline in response to requests, and adapted for use in conjunction with a user interface means including display means for displaying outline items to a user and an input device for generating input information in response to use of said input device by a user, said outline management system comprising:

A. instance storage means for storing outline items organized in said plurality of levels; and B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, for storing said received outline items located on a plurality of branches of said outline in said instance storage means, and for transmitting received and stored outline items located on a plurality of branches of said outline to said display means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, wherein said instance storage means includes entry list means including a plurality of entry means each for storing an outline item received from said applications means, and further includes instance means for identifying said entry list means; and said outline control means receives each outline item from said applications means and stores the outline item in a selected one of said entry means in said entry list means identified by said instance means, wherein:
  A. said input device generates scrolling information, and
  B. said outline control means transmits selected outline items to said display means for display, said outline control means adjusting the selection of the outline items transmitted for display in response to said scrolling information from said input device.

50. An outline management system as defined in claim 49 wherein each entry means in said entry list includes valid flag means having selected conditions indicating whether it contains an outline item, said outline control means including:
  A. entry display identification means for identifying an entry means in response to said scrolling information;
  B. valid flag testing means responsive to said entry display identification means identifying an entry for testing the condition of said valid flag of said identified entry means;
  C. means for generating a callback to said applications means to obtain an outline item associated with said entry means in response to said valid flag testing means determining that the valid flag of said entry means indicates that said entry means does not contain an outline item.

51. An outline management system as defined in claim 49 wherein said scrolling information includes scroll up information, said entry display identification means including entry display deletion means responsive to said scroll up information for selecting an entry means whose associated outline information is to be deleted from said selected outline items transmitted to said display means.

52. An outline management system as defined in claim 51 wherein each entry means includes means for storing a level identification value, said entry display deletion means including:
  A. display entry pointer means for storing pointers identifying entries whose associated outline information is being transmitted for display on said display means;
  B path identification storage means for storing a value identifying a pointer in said display entry pointer means whose outline items correspond to a path to the root of the outline information transmitted for display on said display means;
  C. entry deletion identification means responsive to the contents of said path identification means and said display entry pointer means for comparing the level identification values of said entry means proximate the entry means pointed to by the pointer identified by the contents of said path identification storage means to identify an entry whose associated outline item is to be deleted.

53. An outline management system as defined in claim 52 wherein said entry deletion identification means includes:
  A. first scroll up test means for comparing the level identification value of the entry means identified by the pointer in said display entry pointer means identified by the pointer in said path identification storage means with the level identification value of the entry means identified by the previous pointer in said display entry pointer means and for deleting the outline item associated with the entry means identified by the previous pointer in response to a predetermined comparison result;
  B. second scroll up test means responsive to another predetermined comparison result by said first scroll up test means for comparing the level identification value of the entry means identified by the pointer in said display entry pointer means identified by the pointer in said path identification storage means with the level identification value of the entry means identified by the next pointer in said display entry pointer means and for deleting the outline item identified by the pointer in response to a predetermined comparison result;
  C. third scroll up test means responsive to another predetermined comparison result by said second scroll up test means for comparing the level identification value of the entry means identified by the first pointer in said display entry pointer means after the pointer identified by the pointer in said path identification storage means with the level identification value of the entry means identified by the next pointer in said display entry pointer means and for deleting the outline item identified by the second pointer in response to a predetermined comparison result; and
  D. fourth scroll up test means responsive to another predetermined comparison result by said third scroll up test means for iteratively comparing the level identification values of the entry means identified by pairs of two succeeding pointers in said display entry pointer means after the pointer identified by the pointer in said path identification storage means and for deleting the outline item identified by the first pointer in a pair in response to a predetermined comparison result.

54. An outline management system as defined in claim 50 wherein said scrolling information includes scroll down information, said entry display identification means including scroll down entry display deletion means responsive to said scroll down information for selecting an entry means whose associated outline information is to be deleted from said selected outline items transmitted to said display means.

55. An outline management system as defined in claim 54 wherein each entry means includes means for storing a level identification value, said scroll down entry display deletion means including:
  A. consecutive entry comparison means for iteratively testing two consecutive entries whose associated outline items are being transmitted to said display means for display, beginning from the entry means associated with the last outline item transmitted, to identify two entry means that are not consecutive in said entry list; and
  B. scroll down entry identification means responsive to the identification by said consecutive entry comparison means identification for specifying an entry means in said entry list between said two identified entry means whose associated outline item is to be transmitted to said display means for display.

56. An outline management system as defined in claim 55 in which:
  A. said entry comparison means includes:
    i. index storage means for storing an index value initially identifying the number of entry means whose associated outline items are being transmitted to said display means for display;

ii. display entry pointer means for storing pointers identifying entries whose associated outline information is being transmitted for display on said display means;

iii. scroll down comparison means for iteratively determining the location, in said entry list, of said entry means identified by the pointer in said display entry pointer means identified by said index storage means to the location of said entry means identified by the previous pointer in said display entry pointer means to determine whether they are consecutive; and iv. decrement means for decrementing said index value in said index storage means in response to a negative determination by said scroll down comparison means;

B. said scroll down entry identification means includes:

i. first scroll down test means responsive to a positive determination by said scroll down identification means for comparing (a) the level identification value of said entry means identified by the pointer in said display entry pointer means previous to the pointer identified by said index value, to (b) the level identification value of said entry means in the entry list means previous to the entry means identified by the pointer in said display entry pointer means identified by said index value, and for specifying said entry means identified by the pointer in said display entry pointer means previous to the pointer identified by said index value as said entry means whose associated outline item is to be transmitted to said display means if said level identification values are the same;

ii. second scroll down test means responsive to a negative comparison by said first scroll down test means for iteratively comparing (a) the level identification value of said entry means identified by the pointer in said display entry pointer means previous to the pointer identified by said index value, to (b) the level identification value of said entry means in the entry list means previous to the entry means identified by the pointer in said display entry pointer means identified by said index value, and for specifying said entry means identified by the pointer in said display entry pointer means previous to the pointer identified by said index value as said entry means whose associated outline item is to be transmitted to said display means if said level identification values differ by a selected value; and iii. third scroll down test means responsive to a negative comparison by said second scroll down test means for specifying the entry means in said entry list means following each entry means identified by the pointer in said display entry pointer means previous to the pointer identified by said index value as the said entry means whose associated outline item is to be transmitted to said display means.

57. An outline management system adapted for use in conjunction with a user interface means including display means for displaying outline items to a user and an input device for generating input information in response to use of said input device by a user, said outline management system comprising:

A. applications program means, comprising software, for organizing information stored in a computer database into a multiple-level outline including a plurality of outline items organized in a plurality of levels and for retrieving outline items from said outline in response to requests, and B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user parent-child relationships among said received outline items that said user wishes to have displayed by said display means, wherein said input device generates input information in response to said user performing a dragging operation upon a displayed outline item, and said outline control means modifies displayed parent-child relationships between outline items in a manner determined by said input information corresponding to said dragging operation.

58. An outline management system as defined in claim 57, wherein said outline control means notifies said applications program means of said input information corresponding to said dragging operation.

59. An outline management system as defined in claim 57, wherein said input device further generates input information in response to said user performing a scrolling operation simultaneously with said dragging operation, and said outline control means, in response to said scrolling information, deletes at least one outline item from display by said display means and adds at least one outline item for display by said display means, before said outline control means modifies displayed parent-child relationships between outline items in a manner determined by said input information corresponding to said dragging operation.

60. An outline management system adapted for use in conjunction with a user interface means including display means for displaying outline items to a user and an input device for generating input information in response to use of said input device by a user, said outline management system comprising:

A. applications program means, comprising software, for organizing information stored in a computer database into a multiple-level outline including a plurality of outline items organized in a plurality of levels and for retrieving outline items from said outline in response to requests, and outline control means, interfacing with said applications program means and said user interface means, for receiving input information from said user interface means indicating to said outline control means which outline items said user wishes to have displayed by said display means, for requesting and receiving, from said applications program means, outline items that said user wishes to have displayed by said display means and that are located on a plurality of branches of said outline, for transmitting received outline items located on a plurality of branches of said outline to said display means of said user interface means for simultaneous display, for receiving input information from said user interface means corresponding to said user performing a selection operation simultaneously upon displayed outline items in differing branches and levels of said outline, and for causing said display means to display said outline items upon which said selection operation has been performed in a manner that distinguishes display of said outline items upon which said selection operation has been performed from outline items upon which said selection operation has not been performed.

61. An outline management system adapted for use in conjunction with a user interface means including display means for displaying a portion of an outline to a user and an input device for generating input information in response to use of said input device by a user, said outline management system comprising:
  A. applications program means, comprising software, for organizing information stored in a computer database into a multiple-level outline including a plurality of outline items organized in a plurality of levels and for retrieving outline items from said outline in response to requests, and
  B. outline control means, interfacing with said applications program means and said user interface means, for receiving said input information from said user interface means, said input information indicating to said outline control means which outline items said user wishes to have displayed by said display means, for requesting and receiving, from said applications program means, outline items from a portion of said outline that said user wishes to have displayed by said display means, said received outline items being located on a plurality of branches of said outline, and for transmitting received outline items located on a plurality of branches of said outline to said display means of said user interface means for simultaneous display, said outline control means transmitting said received outline items that said user wishes to have displayed to said display means in a manner such that relative locations of said received outline items on said display means render apparent to said user a path to a root of said outline for each displayed outline item.

62. An outline management system adapted for use in conjunction with a user interface means including display means for displaying outline items to a user and an input device for generating input information in response to use of said input device by a user, said outline management system comprising:
  A. applications program means, comprising software, for organizing information stored in a computer database into a multiple-level outline including a plurality of outline items organized in a plurality of levels and for retrieving outline items from said outline in response to requests, and
  B. outline control means, interfacing with said applications program means and said user interface means, for receiving said input information from said user interface means, said input information indicating to said outline control means which outline items said user wishes to have displayed by said display means, for requesting and receiving, from said applications program means, outline items that said user wishes to have displayed by said display means and that are located on a plurality of branches of said outline, and for transmitting received outline items located on a plurality of branches of said outline to said display means of said user interface means for simultaneous display,
  said outline control means transmitting said received outline items that said user wishes to have displayed to said display means in a manner such that relative locations of said received outline items on said display means render apparent to said user a path to a root of said outline for each displayed outline item,
  wherein said input device generates input information in response to said user performing a scrolling operation; said outline control means, in response to said scrolling information, deletes at least one outline item from said display means and adds at least one outline item to said display means; and said outline control means transmits outline items to said display in a manner such that, throughout said scrolling operation, relative locations of said outline items on said display means render apparent to said user said path to said root of said outline for each displayed outline item.

63. An outline management system adapted for use in conjunction with a plurality of user interface means including a respective plurality of display means for displaying a respective plurality of portions of an outline to a plurality of users and a respective plurality of input devices for generating input information in response to use of said input devices by said users, said outline management system comprising:
  A. applications program means, comprising software, for organizing information stored in a computer database into a multiple-level outline including a plurality of outline items organized in a plurality of levels and for retrieving outline items from said outline in response to requests, and
  B. outline control means, interfacing with said applications program means and said plurality of user interface means, for receiving input information from each of said plurality of user interface means, said input information indicating to said outline control means which outline items each of said plurality of users wishes to have displayed by a respective display means, for requesting and receiving, from said applications program means, outline items from a plurality of portions of said outline that respective users wish to have displayed, said outline items in each of said plurality of portions of said outline being located on a plurality of branches and levels of said outline, and for transmitting received outline items located on a plurality of branches and levels of said outline to respective ones of said display means for simultaneous display.

* * * * *

UNITED STATES PATENT AND TRADEMARK OFFICE
CERTIFICATE OF CORRECTION

PATENT NO. : 5,230,072
DATED : July 20, 1993
INVENTOR(S) : Duane A. Smith, et al It is certified that error appears in the above-indentified patent and that said Letters Patent is hereby corrected as shown below:

Col. 5, line 9, after "24" insert a period.

Col. 7, line 9, "2" should be --20--.

Col. 8, line 26, "2" should be --22--.

Col. 11, line 66, "2" should be --24--.

Col. 12, line 36, "2" should be --20--.

Col. 14, line 39, "need" should be --needs--.

Col. 16, line 52, "2" should be --20--.

Col. 17, line 46, "2" should be --24--.

Col. 18, line 37, "array" should be --arrays--.

Col. 20, line 21, "1" should be --15--.

UNITED STATES PATENT AND TRADEMARK OFFICE
CERTIFICATE OF CORRECTION

PATENT NO. : 5,230,072
DATED : July 20, 1993
INVENTOR(S) : Duane A. Smith, et al It is certified that error appears in the above-indentified patent and that said Letters Patent is hereby corrected as shown below:

Col. 25, claim 17, line 60 "application" should be --applications--.

Col. 26, claim 17, line 21, "instances" should be --instance--.

Col. 31, claim 30, line 22, after "means" insert a comma.

Col. 38, claim 54, line 2, "50" should be --49--.

Col. 40, claim 60, line 66, before "outline" insert --B.--.

Signed and Sealed this

Thirtieth Day of April, 1996

*Attest:*

BRUCE LEHMAN

*Attesting Officer*  *Commissioner of Patents and Trademarks*